United States Patent
Tai et al.

(10) Patent No.: US 9,744,748 B2
(45) Date of Patent: Aug. 29, 2017

(54) MULTILAYERED STRUCTURE AND LAMINATE, AND METHOD FOR PRODUCTION OF THE SAME

(75) Inventors: Shinji Tai, Pasadena, TX (US); Hiroshi Kawai, Okayama (JP); Satoshi Yamakoshi, Okayama (JP); Kouta Isoyama, Okayama (JP); Masao Hikasa, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 734 days.

(21) Appl. No.: 13/638,753

(22) PCT Filed: Mar. 30, 2011

(86) PCT No.: PCT/JP2011/058010
§ 371 (c)(1),
(2), (4) Date: Oct. 1, 2012

(87) PCT Pub. No.: WO2011/125739
PCT Pub. Date: Oct. 13, 2011

(65) Prior Publication Data
US 2013/0017383 A1 Jan. 17, 2013

(30) Foreign Application Priority Data
Mar. 31, 2010 (JP) ................. 2010-084719

(51) Int. Cl.
| B32B 27/08 | (2006.01) |
| B32B 27/30 | (2006.01) |
| B32B 27/32 | (2006.01) |
| B29C 47/06 | (2006.01) |
| B32B 7/02 | (2006.01) |
| B32B 27/28 | (2006.01) |
| B32B 27/34 | (2006.01) |
| B32B 27/36 | (2006.01) |
| B32B 27/40 | (2006.01) |
| B29C 47/00 | (2006.01) |
| B29C 51/02 | (2006.01) |
| B29K 29/00 | (2006.01) |
| B29L 7/00 | (2006.01) |

(52) U.S. Cl.
CPC ............ *B32B 27/08* (2013.01); *B29C 47/065* (2013.01); *B32B 7/02* (2013.01); *B32B 27/28* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *B32B 27/40* (2013.01); B29C 47/0004 (2013.01); B29C 47/0021 (2013.01); B29C 51/02 (2013.01); B29K 2029/00 (2013.01); B29K 2995/0069 (2013.01); B29L 2007/008 (2013.01); B32B 2250/04 (2013.01); B32B 2250/05 (2013.01); B32B 2250/24 (2013.01); B32B 2250/42 (2013.01); B32B 2270/00 (2013.01); B32B 2307/7242 (2013.01); B32B 2307/74 (2013.01); B32B 2439/70 (2013.01); Y10T 428/24975 (2015.01); Y10T 428/3192 (2015.04)

(58) Field of Classification Search
CPC ............ B32B 2250/04; B32B 2250/05; B32B 2250/24; B32B 2250/42; B32B 2270/00; B32B 2307/7242; B32B 2307/74; B32B 2439/70; Y10T 428/24975; Y10T 428/3192
See application file for complete search history.

(56) References Cited

U.S. PATENT DOCUMENTS

| 8,178,180 B2 | 5/2012 | Penttinen et al. |
| 2005/0147778 A1 | 7/2005 | Tai et al. |
| 2009/0324861 A1 | 12/2009 | Penttinen et al. |

FOREIGN PATENT DOCUMENTS

| CN | 1121089 A | 4/1996 |
| CN | 1649956 A | 8/2005 |

(Continued)

OTHER PUBLICATIONS

Ikeda et al (JP 2006-233222 machine translation), Sep. 7, 2006.*

(Continued)

*Primary Examiner* — Aaron Austin
*Assistant Examiner* — Lawrence Ferguson
(74) *Attorney, Agent, or Firm* — Oblon, McClelland, Maier & Neustadt, L.L.P.

(57) ABSTRACT

An object of the invention is to provide a multilayered structure having very superior gas barrier properties and being excellent in flex resistance, pinhole resistance, stretchability, thermoformability and interlayer adhesiveness, and having superior durability enabling characteristics such as high gas barrier properties to be maintained even if used with deformation such as flexion and/or stretching, and to provide a laminate in which the multilayered structure is used, and a production method thereof. Provided by the present invention is a multilayered structure in which at least 4 resin-layers constituted with a resin composition containing an ethylene-vinyl alcohol copolymer are contiguously laminated. A single layer of the resin layer has an average thickness of preferably no less than 0.01 μm and no greater than 10 μm. The average thickness is preferably no less than 0.1 μm and no greater than 1,000 μm. When the content of ethylene units of the ethylene-vinyl alcohol copolymer is no less than 3 mol % and no greater than 70 mol %, the saponification degree is preferably no less than 80 mol %.

20 Claims, No Drawings

(56) References Cited

FOREIGN PATENT DOCUMENTS

| | | |
|---|---|---|
| EP | 1 479 725 A1 | 11/2004 |
| EP | 2 508 343 A1 | 10/2012 |
| JP | 2 261847 | 10/1990 |
| JP | 5 31863 | 2/1993 |
| JP | 2004-276566 | 10/2004 |
| JP | 2005 89483 | 4/2005 |
| JP | 2008 201432 | 9/2008 |
| JP | 2009 544495 | 12/2009 |
| JP | 2010 7041 | 1/2010 |
| WO | 03 072653 | 9/2003 |
| WO | WO 2008/012396 A1 | 1/2008 |

OTHER PUBLICATIONS https://www.vocabulary.com/dictionary/adjacent, Sep. 2016.*
Extended European Search Report issued Aug. 5, 2013 in Patent Application No. 11765639.7.
International Search Report Issued Jun. 21, 2011 in PCT/JP11/58010 Filed Mar. 30, 2011.
European Office Action issued Nov. 30, 2015 in Patent Application No. 11 765 639.7.
Office Action issued Jun. 14, 2016, in Canadian Patent Application No. 2,794,706.

\* cited by examiner

MULTILAYERED STRUCTURE AND LAMINATE, AND METHOD FOR PRODUCTION OF THE SAME

TECHNICAL FIELD

The present invention relates to a multilayered structure in which at least 4 resin-layers constituted with a resin composition containing an ethylene-vinyl alcohol copolymer are contiguously laminated, and a laminate in which this multilayered structure is used, and production methods thereof. More particularly, the present invention relates to a multilayered structure, and a laminate having very superior gas barrier properties, and also being excellent in flexibility, pinhole resistance, stretchability and thermoformability.

BACKGROUND ART

Recently, for the purpose of improving various types of performances such as gas barrier properties, various multilayered structures have been proposed in which a plurality of resin layers are laminated, each layer having a thickness of micron or submicron order. In particular, laminated films having an ethylene-vinyl alcohol copolymer layer have been used in applications such as packaging materials for food and medical applications, taking advantages of their superior gas barrier properties, stretchability, thermoformability and the like.

Conventional multilayered structures in which a plurality of layers including such an ethylene-vinyl alcohol copolymer layer, which were proposed taking into consideration gas barrier properties, and developed for the purpose of improving various characteristics include, for example (1) a multilayered structure having two ethylene-vinyl alcohol copolymer layers having different ethylene contents and degrees of saponification, with one layer containing a boron compound (see Japanese Unexamined Patent Application, Publication No. H5-31863), (2) a multilayered structure having layers constituted with a composition containing at least two types of ethylene-vinyl alcohol copolymers having different ethylene contents, with at least one face of the layer having a thermoplastic resin layer (see Japanese Unexamined Patent Application, Publication No. H2-261847), and the like.

The conventional multilayered structure (1) described above has an improved heat sealing property while maintaining gas barrier properties and non adsorptivity of the contents. Moreover, the conventional multilayered structure (2) described above also has improved formability while maintaining gas barrier properties. However, these multilayered structures do not satisfy further improvement of gas barrier properties, and are accompanied by disadvantages that significant deterioration of gas barrier properties, etc., is inevitable upon deformation such as flexion and/or stretching.

PRIOR ART DOCUMENTS

Patent Documents

PATENT DOCUMENT 1 Japanese Unexamined Patent Application, Publication No. H5-31863
PATENT DOCUMENT 2 Japanese Unexamined Patent Application, Publication No. H2-261847

SUMMARY OF THE INVENTION

Problems to be Solved by the Invention

The present invention was made in view of these disadvantages, and an object of the invention is to provide a multilayered structure that has very superior gas barrier properties and is capable of maintaining characteristics such as gas barrier properties even when used with deformation such as stretching and/or flexion imposed, and is also excellent in flex resistance, pinhole resistance, stretchability, thermoformability, and the like. Furthermore, another aspect of the invention is to provide a laminate provided with such a multilayered structure. Additionally, still another object of the invention is to provide methods for producing a multilayered structure and a laminate having such characteristics, while suppressing an increase in production costs.

Means for Solving the Problems

One aspect of the invention made for solving the foregoing problems provides
a multilayered structure including at least 4 resin-layers, in which the at least 4 resin-layers are constituted with a resin composition containing an ethylene-vinyl alcohol copolymer and are contiguously laminated.

Since the multilayered structure includes contiguously laminated at least 4 resin-layers constituted with a resin composition containing an ethylene-vinyl alcohol copolymer, very superior gas barrier properties are provided. In addition, the multilayered structure has superior stretchability and thermoformability due to at least 4 resin-layers. In addition, since adjacent at least 4 resin-layers commonly include an ethylene-vinyl alcohol copolymer, superior interlayer adhesiveness is achieved. Owing to the superior interlayer adhesiveness and the configuration with at least 4 resin-layers, the multilayered structure has high flex resistance and pinhole resistance, and also characteristics such as high gas barrier properties can be maintained even against deformation such as flexion and/or stretching.

The average thickness of a single layer of the resin layer is preferably no less than 0.01 μm and no greater than 10 μm. When the average thickness of the resin layer falls within the above range, the number of layers can be increased even if the entirety of the multilayered structure has an identical thickness, and consequently, the gas barrier properties, flex resistance, pinhole resistance, stretchability and the like of the multilayered structure can be further improved.

The average thickness of the multilayered structure is preferably no less than 0.1 μm and no greater than 1,000 μm. When the average thickness of the multilayered structure falls within the above range, along with the effects achievable by the average thickness of the resin layer falling within the range as described above, gas barrier properties, durability, stretchability and the like can be further improved while maintaining applicability to the food packaging materials, and the like.

In the ethylene-vinyl alcohol copolymer constituting the resin layer, the content of ethylene units is preferably no less than 3 mol % and no greater than 70 mol %, and the saponification degree is preferably no less than 80 mol %. When the content of ethylene units and the saponification degree thus fall within the above range, gas barrier properties of the multilayered structure are further improved, and additionally melt formability can be improved. Furthermore, owing to the high melt formability, a multilayered structure having a favorable and uniform state can be obtained, and also interlayer adhesiveness can be improved. In addition, moisture resistance of the multilayered structure can be improved.

It is preferred that the ethylene-vinyl alcohol copolymer constituting the resin layer includes at least one selected from the group consisting of the following structural units (I) and (II), and the content of the structural unit (I) or (II) with respect to the total of the structural units is no less than 0.5 mol % and no greater than 30 mol %. When the ethylene-vinyl alcohol copolymer constituting the resin layer has the following structural unit (I) or (II) at the content falling within the above range, flexibility and processing characteristics of the resin composition constituting the resin layer are improved; therefore, flex resistance, pinhole resistance, durability, stretchability, thermoformability and interlayer adhesiveness of the multilayered structure can be improved.

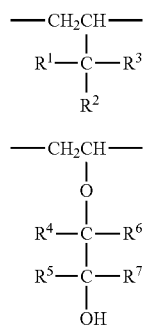

in the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; two among $R^1$, $R^2$ and $R^3$ may bind with one another, wherein in a case in which the two among $R^1$, $R^2$ and $R^3$ both represent a hydrogen atom, the two do not bind with one another; and the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, a carboxyl group or a halogen atom; and in the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; $R^4$ and $R^5$ or $R^6$ and $R^7$ may bind with one another, wherein in a case in which both $R^4$ and $R^5$ or both $R^6$ and $R^7$ represent a hydrogen atom, the $R^4$ and $R^5$ or both $R^6$ and $R^7$ do not bind with one another; the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, an alkoxy group, a carboxyl group or a halogen atom.

It is preferred that the resin composition contains a thermoplastic resin having an oxygen-scavenging ability. When the resin composition constituting the resin layer thus contains a thermoplastic resin having an oxygen-scavenging ability, a high oxygen-scavenging function is added to the multilayered structure, and thus the gas barrier properties and durability are further improved.

The resin composition preferably contains a desiccant. When the resin composition constituting the resin layer thus contains a desiccant, the included ethylene-vinyl alcohol copolymer is maintained to have a dry state, whereby gas barrier properties of the multilayered structure can be effectively improved.

It is desired that the resin composition has a melt viscosity ($\eta_1$) as determined at a temperature of 210° C. and a shear rate of 10/sec being no less than $1 \times 10^2$ Pa·s and no greater than $1 \times 10^4$ Pa·s and a melt viscosity ($\eta_2$) as determined at a temperature of 210° C. and a shear rate of 1,000/sec being no less than $1 \times 10^1$ Pa·s and no greater than $1 \times 10^3$ Pa·s, and a ratio ($\eta_2/\eta_1$) of the melt viscosity satisfies the following formula (1). When the resin composition constituting the resin layer thus has a melt viscosity and a ratio of the melt viscosity falling within the above range, the resin layer, in turn, the multilayered structure can be formed with a size as intended and at a high speed, and a multilayered structure having a uniform and favorable appearance can be obtained. Moreover, an effect of improving the interlayer adhesiveness is also exhibited.

$$-0.8 \leq (½)\log_{10}(\eta_2/\eta_1) \leq -0.1 \tag{1}$$

As the resin layers, it is preferred that a layer A and a layer B constituted with resin compositions, respectively, that are different with one another in terms of at least one selected from the group consisting of the formulation, the blend ratio and the structure of the ethylene-vinyl alcohol copolymer. When the multilayered structure thus has as adjacent at least 4 layers containing an ethylene-vinyl alcohol copolymer, resin layers constituted with resin compositions, respectively, that are different with one another in terms of at least one selected from the group consisting of the formulation, the blend ratio and the structure of the ethylene-vinyl alcohol copolymer, characteristics such as gas barrier properties, flex resistance, pinhole resistance, stretchability and thermoformability can be adjusted. In addition, a synergistic effect can be achieved by imparting different functions to the layer A and the layer B, and/or compensation of the layer A and the layer B with each other. Accordingly, characteristics such as gas barrier properties, stretchability and thermoformability of the multilayered structure can be further improved, and additional characteristics other than these characteristics can be also imparted.

It is preferred that the layer A and the layer B are alternately laminated. When the layer A and the layer B are thus alternately laminated, the aforementioned synergistic effect can be effectively achieved, and as a result, gas barrier properties, durability, and other characteristics of the multilayered structure can be further improved.

The difference between the contents of ethylene units of the ethylene-vinyl alcohol copolymer constituting the layer A and of the ethylene-vinyl alcohol copolymer constituting the layer B preferably no less than 3 mol % and no greater than 50 mol %. When the difference between the contents of ethylene units of the ethylene-vinyl alcohol copolymers of the layer A and of the layer B falls within the above range, flex resistance, pinhole resistance, stretchability and thermoformability of the multilayered structure can be further improved, whereby a multilayered structure that is conveniently usable in various applications can be provided.

It is preferred that only one of the resin compositions of the layer A and the layer B contains a thermoplastic resin having an oxygen-scavenging ability. When only one of the resin layers to be laminated thus contains a thermoplastic resin having an oxygen-scavenging ability, flex resistance, pinhole resistance, stretchability and thermoformability of the multilayered structure can be further improved, and further, a multilayered structure can be provided that suppresses diffusion of an unpleasant odor owing to the presence of the other layer even if oxygen is absorbed.

Only one resin composition of the layer A and the layer B preferably contains a desiccant. When a desiccant is contained in the resin composition, the included ethylene-vinyl alcohol copolymer is maintained to have a dry state, whereby gas barrier properties can be improved. On the other hand, since the desiccant has a powder form, gas barrier properties may be affected due to the desiccant contained. Therefore, when only one resin composition of the layer A and the layer B contains a desiccant, such an affection can be confined to the only one resin-layer, and thus additional improvement of the gas barrier properties in the entirety of the multilayered structure can be achieved.

A ratio ($\eta_{2B}/\eta_{2A}$) of a melt viscosity ($\eta_{2B}$) of the resin composition of the layer B to a melt viscosity ($\eta_{2A}$) of the resin composition of the layer A as determined at a temperature of 210° C. and a shear rate of 1,000/sec is preferably 0.1 or greater and 10 or less. When the ratio ($\eta_{2B}/\eta_{2A}$) of the melt viscosity falls within the above range, uneven flow between the layer A and the layer B in the multilayered structure obtained by melt forming can be inhibited, and deterioration of favorability of appearance, barrier properties, flex resistance, pinhole resistance, durability, stretchability can be prevented. In addition, adhesive strength can be further increased.

The resin compositions constituting the resin layer of the at least 4 layers are preferably identical. When the adjacent at least 4 resin-layers are thus formed with an identical resin composition, very superior gas barrier properties can be attained. In addition, since high interlayer adhesiveness is provided, durability can be improved. Also, the number of the type of the resin composition used as a basic material of the multilayered structure can be decreased, and as a result, production of such a multilayered structure that has very superior gas barrier properties and favorable durability is facilitated.

When a layer of a thermoplastic resin other than the ethylene-vinyl alcohol copolymer is further laminated on the multilayered structure, a laminate having superior gas barrier properties, and being superior in durability can be provided. Selection of the type of the thermoplastic resin layer enables various functions such as heat sealing properties release properties to be imparted.

The average thickness of the laminate is preferably no less than 1 μm and no greater than 5,000 μm. When the average thickness of the multilayered structure falls within the above range, a multilayered structure having superior gas barrier properties, durability, stretchability and the like can be produced while maintaining applicability to food packing materials, etc.

In the laminate, it is preferred that the resin composition of a layer positioned outermost of the multilayered structure contains at least one metal salt selected from the group consisting of an alkali metal salt, an alkaline earth metal salt and a metal salt of a group IV d-block element of the periodic table, and that the thermoplastic resin layer be laminated so as to be in contact with an outermost layer of the multilayered structure. Accordingly, since the metal salt added for enhancing the interlayer adhesiveness is included in the resin layer positioned outermost of the multilayered structure, the adhesiveness between the outermost layer and the adjacent thermoplastic resin layer can be enhanced, and consequently, a laminate having superior strength can be provided.

The laminate is suitably used for food packaging. It is necessary that packaging materials used for food packaging, etc. maintain superior gas barrier properties while repeatedly subjected to deformation such as stretching and/or flexion during use, and thus the laminate having characteristics such as very superior gas barrier properties, durability, and flexibility as described above may be suitably used for such packing materials.

Additionally, other aspect of the present invention made for solving the foregoing problems provides a method for producing the multilayered structure, and the method is characterized by including forming by a multilayer coextrusion process using a resin composition containing an ethylene-vinyl alcohol copolymer. According to the method for producing a multilayered structure, a multilayered structure that has very superior gas barrier properties, and is excellent in flex resistance, pinhole resistance, stretchability, interlayer adhesiveness can be produced easily and certainly while suppressing an increase in production costs.

In addition, the foregoing problems can be proved also by a method for producing a laminate by a multilayer coextrusion process using a resin composition containing an ethylene-vinyl alcohol copolymer, and a thermoplastic resin. According to the method for producing a laminate, a thermoplastic resin layer can be formed concomitantly with production of the multilayered structure; therefore, the laminate can be produced easily and certainly while suppressing an increase in production costs, and further an interlayer adhesive strength between the outermost layer of the multilayered structure constituted with the resin composition containing an ethylene-vinyl alcohol copolymer, and the thermoplastic resin layer can be superior.

Effects of the Invention

As explained in the foregoing, the multilayered structure of the present invention has very superior gas barrier properties since at least resin-layers containing an ethylene-vinyl alcohol copolymer are contiguously laminated. Also, the multilayered structure is superior in flex resistance, pinhole resistance, stretchability, thermoformability and the like, and has superior interlayer adhesiveness; therefore, when used for food packaging materials, etc., accompanied by deformation such as flexion and/or stretching, the multilayered structure can exhibit superior durability as it can maintain characteristics such as superior gas barrier properties. Moreover, the laminate of the present invention has superior gas barrier properties, and is excellent in durability. Additionally, according to the multilayered structure of the present invention and method for producing a laminate, a multilayered structure and a laminate having such characteristics can be produced easily and certainly while suppressing an increase in production costs.

DESCRIPTION OF EMBODIMENTS

Hereinafter, embodiments of the present invention are described in detail. The multilayered structure includes at least 4 resin-layers, which are contiguously laminated, constituted with a resin composition containing an ethylene-vinyl alcohol copolymer (hereinafter, also referred to as "EVOH").

With regard to the layer configuration, the resin layer, relationship among resin layers and the production method of the multilayered structure will be explained below in this order.

<Layer Configuration of the Multilayered Structure>

The multilayered structure has at least 4 resin-layers containing EVOH contiguously provided. Owing to the configuration in which at least 4 resin-layers containing EVOH are laminated, gas barrier properties can be improved. Although the reason for improvement of the gas barrier properties by at least 4 resin-layers containing EVOH contiguously laminated is not necessarily certain, it is envisaged that lamination of at least 4 layers allows e.g., enhanced orientation of the molecules of the copolymer to be attained. In addition, due to the configuration in which at least 4 resin-layers are laminated, continuous development of defects such as pinhole and breakage can be reduced, and as a result, the multilayered structure has characteristics such as durability enabling very superior gas barrier properties, etc., to be maintained, resulting from the structure per se. In these regards, and in light of the production, total number of the resin layers is preferably at least 6 layers, more preferably at least 10 layers, and particularly preferably at least 15 layers.

The lower limit of the average thickness of the multilayered structure is preferably 0.1 μm, more preferably 1 μm, and still more preferably 5 μm. On the other hand, the upper limit of the average thickness of the multilayered structure is preferably 1,000 μm, more preferably 500 μm, still more preferably 250 μm, even more preferably 100 μm, and particularly preferably 50 μm. When the average thickness of the multilayered structure is less than the lower limit described above, the strength becomes insufficient, whereby use of the multilayered structure may be difficult. To the contrary, when the average thickness of the multilayered structure is beyond the upper limit described above, flexibility, formability and the like deteriorate, whereby an increase in production costs may be brought. Note that the average thickness of the multilayered structure may be determined by averaging the measurements of the thickness along the cross section at arbitrarily selected nine points of the multilayered structure.

The lower limit of the average thickness of the resin layer in terms of a single layer is preferably 0.01 μm, more preferably 0.05 μm, and still more preferably 0.1 μm. On the other hand, the upper limit of the average thickness of the resin layer in terms of a single layer is preferably 10 μm, more preferably 7 μm, still more preferably 5 μm, and even more preferably 3 μm, 2 μm, 1 μm, 0.5 μm and 0.25 μm. When the average thickness of the resin layer in terms of a single layer is less than the lower limit described above, formation with a uniform thickness becomes difficult, or successful formation of the layer may fail depending on the situation, leading to generation of a disordered layer and/or uneven flow, whereby the gas barrier properties and their durability of the multilayered structure may deteriorate. To the contrary, when the average thickness of the resin layer in terms of a single layer is beyond the upper limit described above, it becomes difficult to increase the number of layers if the entirety of the multilayered structure has an identical average thickness, whereby the effect of improving gas barrier properties due to the multilayer as described above may not be effected, and stretchability and thermoformability of the multilayered structure may be deteriorated. It is to be noted that the average thickness of the resin layer in terms of a single layer refers to a value derived by dividing the average thickness of the multilayered structure by the number of the resin layers.

<Resin Layer>

The at least 4 resin-layers that configure the multilayered structure is constituted with a resin composition containing EVOH. Since the resin composition constituting the resin layer contains EVOH, a multilayered structure that is superior in gas barrier properties can be obtained.

(Resin Composition)

The resin composition contains EVOH.

(EVOH)

EVOH included in the resin composition constituting the resin layer has an ethylene unit and a vinyl alcohol unit as principal structural units. The EVOH may include one or a plurality of types of other structural units in addition to the ethylene unit and the vinyl alcohol unit.

The EVOH is typically obtained by polymerizing ethylene and a vinyl ester, and saponificating the resulting ethylene-vinyl ester copolymer.

The lower limit of the content of ethylene units in the EVOH (i.e., the proportion of the number of ethylene units with respect to the total number of the monomer units in the EVOH) is preferably 3 mol %, more preferably 10 mol %, still more preferably 20 mol %, and particularly preferably 25 mol %. On the other hand, the upper limit of the content of ethylene units in the EVOH is preferably 70 mol %, more preferably 60 mol %, still more preferably 55 mol %, and particularly preferably 50 mol %. When the content of ethylene units in the EVOH is less than the lower limit, water resistance, hot water resistance and a gas barrier property under a high humidity of a multilayered structure may be impaired, or melt formability of a multilayered structure may be deteriorated. To the contrary, when the content of ethylene units in the EVOH exceeds the upper limit, a gas barrier property of the multilayered structure may be impaired.

The lower limit of a saponification degree of the EVOH (i.e., a proportion of the number of vinyl alcohol units with respect to the total number of vinyl alcohol units and vinyl ester units in the EVOH) is preferably 80 mol %, more preferably 95 mol % and further preferably 99 mol %. On the other hand, the upper limit of the saponification degree of the EVOH is preferably 100 mol % and more preferably 99.99 mol %. When the saponification degree of the EVOH is less than the lower limit, melt formability may be deteriorated, and further the gas barrier property of the multilayered structure may be impaired and coloring resistance may be unsatisfactory. To the contrary, when the saponification degree of EVOH is beyond the upper limit, improvement of the gas barrier properties and the like with respect to an increase in production costs of EVOH can be expected to an unsatisfactory extent. Such EVOH may be used alone; however, an embodiment in which such EVOH is used as a blend with EVOH having a saponification degree exceeding 99 mol % is also suitable.

It is preferred that the content G (mol %) of the 1,2-glycol bond structural units in EVOH satisfies the following formula (2), and the intrinsic viscosity be no less than 0.05 L/g and no greater than 0.2 L/g. In the following formula (2), E represents the content of ethylene units (mol %) in EVOH (wherein, $E \leq 64$ (mol %)).

$$G \leq 1.58 - 0.0244 \times E \tag{2}$$

When the resin composition constituting the resin layer includes EVOH having such a content G of 1,2-glycol bond structural units and an intrinsic viscosity, a feature of decreasing humidity dependency of gas barrier properties of the resulting multilayered structure can be exhibited, and favorable transparency and gloss are provided, while lamination with other thermoplastic resin can be facilitated. Therefore, applicability of the multilayered structure as a material for food packaging and the like can be improved. It is to be noted that the content G of the 1,2-glycol bond structural units may be determined in accordance with the method described by S. Aniya et al., (Analytical Science Vol. 1, 91 (1985)), by way of a nuclear magnetic resonance process at a temperature of 90° C. with a dimethyl sulfoxide solution as an EVOH sample.

EVOH preferably has at least one selected from the group consisting of the structural units (I) and (II). The lower limit of the content of at least one selected from the structural units (I) and (II) with respect to the entire structural units is preferably 0.5 mol %, more preferably 1 mol %, and still more preferably 1.5 mol %. On the other hand, the upper limit of the content of at least one selected from the structural units (I) and (II) is preferably 30 mol %, more preferably 15 mol %, and still more preferably 10 mol %. When the resin composition of the resin layer has the structural unit represented by the above formula (I) and/or (II) at a proportion falling within the above range, flexibility and processing characteristics of the resin composition constituting the resin layer are improved, and consequently, enables the stretchability and thermoformability of the multilayered structure to be improved.

In the structural units (I) and (II), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group, and the like.

In the structural unit (I), it is preferred that the $R^1$, $R^2$ and $R^3$ each independently represent a hydrogen atom, a methyl group, an ethyl group, a hydroxyl group, a hydroxymethyl group or a hydroxyethyl group. Among these, it is more preferred that they each independently represent a hydrogen atom, a methyl group, a hydroxyl group or a hydroxymethyl group. When the $R^1$, $R^2$ and $R^3$ each represent these options, stretchability and thermoformability of the multilayered structure can be further improved.

Although the method for allowing EVOH to include the structural unit (I) is not particularly limited, for example, a method in which a monomer derived into the structural unit (I) is copolymerized in polymerization of the ethylene and vinyl ester may be involved. The monomer derived into the structural unit (I) is exemplified by alkene such as propylene, butylene, pentene and hexene; alkene having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, in light of reactivity for copolymerization, and gas barrier properties of the resulting multilayered structure, propylene, 3-acyloxy-1-propene, 3-acyloxy-1-butene, 4-acyloxy-1-butene, and 3,4-diacetoxy-1-butene are preferred. Specifically, among these, propylene, 3-acetoxy-1-propene, 3-acetoxy-1-butene, 4-acetoxy-1-butene, and 3,4-diacetoxy-1-butene are preferred, and of these, 3,4-diacetoxy-1-butene is particularly preferred. In the case of the alkene having an ester, it is derived into the structural unit (I) during the saponification reaction.

In the above structural unit (II), it is preferred that $R^4$ and $R^5$ both represent a hydrogen atom. Particularly, it is more preferred that $R^4$ and $R^5$ both represent a hydrogen atom, one of the $R^6$ and $R^7$ represents an aliphatic hydrocarbon group having 1 to 10 carbon atoms, and the rest represents a hydrogen atom. The aliphatic hydrocarbon group is preferably an alkyl group or an alkenyl group. In light of particular note taken for the gas barrier properties of the multilayered structure, it is particularly preferred that one of the $R^6$ and $R^7$ represents a methyl group or an ethyl group, and the rest represents a hydrogen atom. Alternatively, it is also particularly preferred that one of the $R^6$ and $R^7$ represents a substituent represented by $(CH_2)_hOH$ (wherein, h is an integer of 1 to 8), and the rest represents a hydrogen atom. In the substituent represented by $(CH_2)_hOH$, h is preferably an integer of 1 to 4, more preferably 1 or 2, and particularly preferably 1.

Although the method for allowing EVOH to include the structural unit (II) is not particularly limited, for example, a method in which EVOH obtained by a saponification reaction is allowed to react with a monovalent epoxy compound to permit the EVOH to include the structural unit (II) may be employed. As the monovalent epoxy compound, a compound represented by any of the following formulae (III) to (IX) is suitably used.

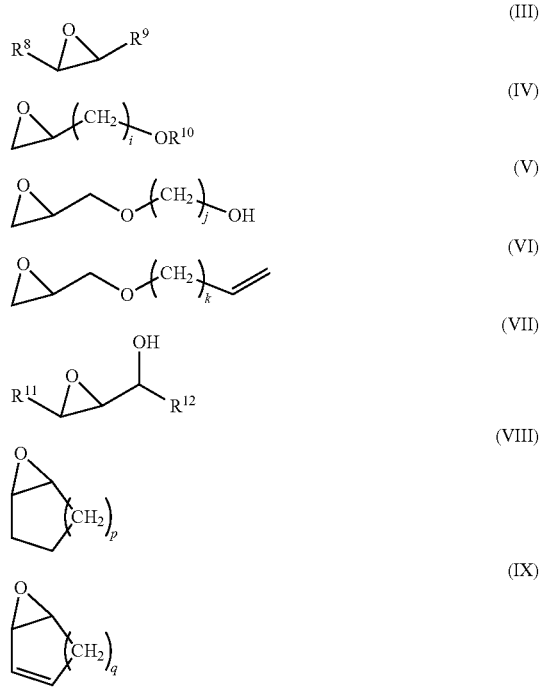

In the above formulae (III) to (IX), $R^8$, $R^9$, $R^{10}$, $R^{11}$ and $R^{12}$ each independently represent a hydrogen atom, an aliphatic hydrocarbon group having 1 to 10 carbon atoms such as an alkyl group or an alkenyl group, an alicyclic hydrocarbon group having 3 to 10 carbon atoms such as a cycloalkyl group or a cycloalkenyl group, or an aromatic hydrocarbon group having 6 to 10 carbon atoms such as a phenyl group; and i, j, k, p and q represent an integer of 1 to 8.

Examples of the monovalent epoxy compound represented by the above formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxidedecane, 2,3-epoxidedecane, 3,4-epoxidedecane, 4,5-epoxidedecane, 5,6-epoxidedecane, 6,7-epoxidedecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, and the like.

Examples of the monovalent epoxy compound represented by the above formula (IV) include methylglycidyl ether, ethylglycidyl ether, n-propylglycidyl ether, isopropyl glycidyl ether, n-butylglycidyl ether, isobutyl glycidyl ether, tert-butylglycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheptane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, and the like.

Examples of the monovalent epoxy compound represented by the above formula (V) include ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, and the like.

Examples of the monovalent epoxy compound represented by the above formula (VI) include 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene, 8-(2,3-epoxy)propoxy-1-octene, and the like.

Examples of the monovalent epoxy compound represented by the above formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, and the like.

Examples of the monovalent epoxy compound represented by the above formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, and the like.

Examples of the monovalent epoxy compound represented by the above formula (IX) include 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, and the like.

Among the aforementioned monovalent epoxy compounds, epoxy compounds having 2 to 8 carbon atoms are preferred. Particularly, in light of easy handling of the compound, and reactivity with EVOH, the monovalent epoxy compound has carbon atoms of more preferably 2 to 6, and still more preferably 2 to 4. Also, among the monovalent epoxy compounds represented by the above formula, compounds represented by the formula (III) or (IV) are particularly preferred. Specifically, in light of reactivity with EVOH and gas barrier properties of the resultant multilayered structure, 1,2-epoxybutane, 2,3-epoxybutane, epoxypropane, epoxyethane and glycidol are preferred, and of these, epoxypropane and glycidol are particularly preferred. In applications for which aspects of good hygiene are demanded such as food packaging applications, beverage packaging applications and medical drug packaging applications, 1,2-epoxybutane, 2,3-epoxybutane, epoxypropane, or epoxyethane is preferably used as the epoxy compound, and epoxypropane is particularly preferably used.

Next, a method for producing EVOH is explained in detail. A method for copolymerization of ethylene and a vinyl ester is not particularly limited, and for example any one of solution polymerization, suspension polymerization, emulsion polymerization, bulk polymerization may be employed. Further, either continuous, or batch-wise system may be adopted.

The vinyl ester which may be used for the polymerization is a fatty acid vinyl ester such as vinyl acetate, vinyl propionate, vinyl pivalate.

In the polymerization, further to the aforementioned components, a copolymerizable monomer, for example, other than those described in the foregoing, an alkene; unsaturated acid such as acrylic acid, methacrylic acid, crotonic acid, maleic acid or itaconic acid, or an anhydride, salt, or mono or dialkyl ester thereof; nitrile such as acrylonitrile or methacrylonitrile; amide such as acrylamide or methacryl amide; olefin sulfonic acid such as vinylsulfonic acid, allyl sulfonic acid or methallyl sulfonic acid, or a salt thereof; alkylvinyl ethers, vinylketone, N-vinylpyrrolidone, vinyl chloride, vinylidene chloride and the like may be copolymerized as a copolymerization component in a small amount. In addition, as a copolymerization component, a vinylsilane compound may be included in an amount of no less than 0.0002 mol % and no greater than 0.2 mol %. Examples of the vinylsilane compound include vinyltrimethoxysilane, vinyltriethoxysilane, vinyltri(β-methoxyethoxy)silane, γ-methacryloyloxypropylmethoxysilane, and the like. Of these, vinyltrimethoxysilane or vinyltriethoxysilane may be suitably used.

The solvent which may be used for the polymerization is not particularly limited as long as it is an organic solvent which can dissolve ethylene, vinyl ester and the ethylene-vinyl ester copolymer. As such a solvent, for example, alcohol such as methanol, ethanol, propanol, n-butanol or tert-butanol; dimethyl sulfoxide, or the like may be used. Of these, methanol is particularly preferred in terms of ease in separation and removal after the reaction.

As the catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropyl propionitrile); an organic peroxide based initiator such as isobutyryl peroxide, cumyl peroxyneodecanoate, diisopropylperoxycarbonate, di-n-propylperoxydicarbonate, t-butylperoxyneodecanoate, lauroylperoxide, benzoylperoxide or t-butylhydroperoxide, or the like may be used.

The polymerization temperature is 20 to 90° C., and preferably 40 to 70° C. The polymerization time is 2 to 15 hours, and preferably 3 to 11 hours. The degree of polymerization is 10 to 90%, and preferably 30 to 80% with respect to the vinyl ester charged. The resin content in the solution after the polymerization is 5 to 85%, and preferably 20 to 70%.

After the polymerization for a predetermined period of time or after reaching to a predetermined degree of polymerization, a polymerization inhibitor is added as needed, and unreacted ethylene gas is eliminated by evaporation, followed by removal of unreacted vinyl ester. In an exemplary method which may be employed for removing unreacted vinyl ester, for example, the copolymer solution is continuously supplied at a constant speed from above a tower packed with Raschig rings, while steam of an organic solvent such as methanol is blown into the bottom of the tower, a mixed steam of the organic solvent such as methanol and the unreacted vinyl ester is distilled off from the top of the tower, whereas the copolymer solution from which the unreacted vinyl ester was eliminated is recovered from the bottom of the tower.

Next, an alkali catalyst is added to the copolymer solution, and the copolymer is saponified. The saponification method may be executed by either a continuous or batchwise system. Examples of the alkali catalyst which may be used include sodium hydroxide, potassium hydroxide, alkali metal alcoholate, and the like.

Conditions of saponification involve, for example in the case of a batchwise system, the copolymer solution concentration of 10 to 50% by mass, the reaction temperature of 30 to 65° C., the catalyst amount used of 0.02 to 1.0 mol per mol of the vinyl ester structural unit, and the saponification time of 1 to 6 hours.

Since EVOH yielded after completing the saponification reaction contains the alkali catalyst, by-product salts such as sodium acetate and potassium acetate, and other impurities, these are preferably eliminated by neutralizing and washing as needed. When EVOH after completing the saponification reaction is washed with water such as ion exchanged water, which is almost free from metal ions, chloride ions and the like, a part of sodium acetate, potassium acetate and the like may remain.

The resin composition constituting the resin layer may contain one or a plurality of types of compounds selected from a phosphate compound, a carboxylic acid and a boron compound depending on the mode for carrying out the invention. When such a phosphate compound, a carboxylic acid or a boron compound is contained in the resin composition of the resin layer, various types of performance of the multilayered structure can be improved.

Specifically, when a phosphate compound is contained in the resin composition of the resin layer containing EVOH, thermal stability of the multilayered structure during melt forming can be improved. The phosphate compound is not particularly limited, and is exemplified by various types of acids such as phosphoric acid and phosphorous acid, and salts thereof, and the like. The phosphoric acid salt may be included in any form such as, for example, a phosphate salt, a monohydrogen phosphate salt or a dihydrogen phosphate salt, and its counter cation species is not particularly limited, which is preferably an alkali metal salt or an alkaline earth metal salt. Particularly, sodium dihydrogenphosphate, potassium dihydrogenphosphate, sodium hydrogenphosphate or potassium hydrogenphosphate is preferred in light of excellent effects of improving thermal stability.

The lower limit of the content of the phosphate compound (the content of the phosphate compound in terms of the phosphoric radical equivalent in the dry resin composition of the resin layer) is preferably 1 ppm, more preferably 10 ppm, and still more preferably 30 ppm. On the other hand, the upper limit of the content of the phosphate compound is preferably 10,000 ppm, more preferably 1,000 ppm, and still more preferably 300 ppm. When the content of the phosphate compound is less than the lower limit described above, coloring during melt forming tends to be significant. Since this tendency is remarkable when heat history is repeated in particular, a product obtained by forming a pellet of the resin composition may lack probability of recovery. To the contrary, when the content of the phosphate compound is beyond the upper limit described above, the product formed may easily generate gel or degraded materials.

In addition, the carboxylic acid included in the resin composition of the resin layer containing EVOH is effective in controlling the pH of the resin composition, and preventing gelation to improve the thermal stability. The carboxylic acid preferably has a pKa at 25° C. of no less than 3.5. When a carboxylic acid having a pKa at 25° C. of less than 3.5 such as oxalic acid, succinic acid, benzoic acid or citric acid is contained, controllability of the pH of the resin composition containing EVOH can be difficult, and coloring resistance and interlayer adhesiveness may be unsatisfactory. In particular, carboxylic acid is preferably acetic acid or lactic acid in light of costs and the like.

The lower limit of the content of the carboxylic acid (the content of the carboxylic acid in the dry resin composition of the resin layer) is preferably 1 ppm, more preferably 10 ppm, and still more preferably 50 ppm. On the other hand, the upper limit of the content of the carboxylic acid is preferably 10,000 ppm, more preferably 1,000 ppm, and still more preferably 500 ppm. When the content of the carboxylic acid is less than the lower limit described above, coloring may occur during the melt forming. To the contrary, the content of the carboxylic acid is beyond the upper limit described above, the interlayer adhesiveness may be insufficient.

Furthermore, the boron compound included in the resin composition of the resin layer containing EVOH is effective in improving thermal stability. In detail, when the boron compound is added to the resin composition constituted with EVOH, it is believed that a chelate compound is produced between EVOH and the boron compound. Thus, use of such EVOH enables more superior thermal stability to be achieved than common EVOH, and mechanical properties to be improved. The boron compound is not particularly limited, and examples include boric acids, boric acid esters, boric acid salts, boron hydrides, and the like. Specifically, boric acids are exemplified by ortho-boric acid ($H_3BO_3$), meta-boric acid, tetraboric acid and the like; boric acid ester are exemplified by triethyl borate, trimethyl borate and the like; boric acid salts are exemplified by alkali metal salts, alkaline earth metal salts and borax of the various types of boric acids described above and the like. Of these, ortho-boric acid is preferred.

The lower limit of the content of the boron compound (the content of the boron compound equivalent to boron in the dry resin composition of the resin layer) is preferably 1 ppm, more preferably 10 ppm, and still more preferably 50 ppm. On the other hand, the upper limit of the content of the boron compound is preferably 10,000 ppm, more preferably 2,000 ppm, and still more preferably 1,000 ppm. When the content of the boron compound is less than the lower limit described above, the effect of improving thermal stability by adding the boron compound may not be achieved. To the contrary, when the content of the boron compound is beyond the upper limit described above, gelation is likely to occur, and forming defectiveness may be caused.

A process for including the phosphate compound, carboxylic acid or boron compound in the resin composition containing EVOH is not particularly limited, and for example, a process in which the phosphate compound is added to the resin composition when a pellet or the like of resin composition containing EVOH is prepared, followed by kneading may be suitably employed. A process for adding to the resin composition is not also particularly limited, and illustrative examples include a process of adding in a form of a dry powder, a process of adding in a paste form impregnated with a solvent, a process of adding in a form suspended in a liquid, a process of adding as a solution dissolved in a solvent, and the like. Of these, in light of allowing for homogenously dispersion, a process of adding as a solution dissolved in a solvent is preferred. The solvent used in these methods is not particularly limited, and water is suitably used in light of solubility of additives, advantages in terms of costs, ease in handling, safety operational environments, and the like. When thus added, a metal salt, a resin other than EVOH and other additives and the like described later may be concomitantly added.

Moreover, as a process for including the phosphate compound, carboxylic acid, boron compound, a process of immersing a pellet or strand obtained with an extruder or the like after the aforementioned saponification in a solution containing these substance dissolved is also preferred in light of enabling homogenously dispersion. Also in this process, water is suitably used as a solvent for similar reasons to those described above. By dissolving a metal salt described later to this solution, the metal salt and the phosphate compound and the like may be contained together with.

The resin composition that constitutes the resin layer preferably contains a compound that has a conjugated double bond having a molecular weight of no greater than 1,000. Due to including such a compound, the color characteristics of the resin composition of the resin layer is improved; therefore, a multilayered structure having a favorable appearance can be provided. Examples of such a compound include conjugated diene compounds having a structure in which at least two carbon-carbon double bonds and one carbon-carbon single bond are alternately linked, triene compounds having a structure in which three carbon-carbon double bonds and two carbon-carbon single bonds are alternately linked, conjugated polyene compounds having a structure in which more carbon-carbon double bonds and carbon-carbon single bonds are alternately linked, conjugated triene compounds such as 2,4,6-octatriene, and the like. Furthermore, in the compound that has a conjugated double bond, a plurality of conjugated double bonds may be present independently in one molecule, and for example, a compound in which three conjugated trienes are included in the same molecule, such as wood oil, may be also involved.

Examples of the compound that has a conjugated double bond may have, for example, any of other various types of functional groups such as a carboxyl group and salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and salts thereof, a phosphoric acid group and salts thereof, a phenyl group, a halogen atom, a double bond, a triple bond, and the like. Such a functional group may be directly bound to a carbon atom in the conjugated double bond, or may be bound to a position away from the conjugated double bond. A multiple bond in the functional group may be present at a position capable of conjugating with the conjugated double bond, and for example, 1-phenylbutadiene having a phenyl group, and sorbic acid having a carboxyl group and the like are also included in the compound that has a conjugated double bond as referred to herein. Specific examples of the compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, myrcene, and the like.

The conjugated double bond in the compound that has a conjugated double bond includes not only a conjugated double bond between aliphatic moieties such as 2,3-dimethyl-1,3-butadiene or sorbic acid, but also a conjugated double bond between aliphatic and aromatic moieties such as 2,4-diphenyl-4-methyl-1-pentene or 1,3-diphenyl-1-butene. Note that in light of possibility to obtain a multilayered structure having more superior appearance, the compound that includes a conjugated double bond between aliphatic moieties is preferred, and a compound that includes a conjugated double bond having a polar group such as a carboxyl group or a salt thereof, or a hydroxyl group is also preferred. Moreover, a compound that includes a conjugated double bond between aliphatic moieties and having a polar group is particularly preferred.

The molecular weight of the compound that has a conjugated double bond is preferably no greater than 1,000. When the molecular weight is greater than 1,000, surface smoothness, extrusion stability and the like of the multilayered structure may be deteriorated.

The lower limit of the content of the compound that has a conjugated double bond having a molecular weight of no greater than 1,000 is, in light of achievable effects, preferably 0.1 ppm, more preferably 1 ppm, still more preferably 3 ppm, and particularly preferably 5 ppm. On the other hand, the upper limit of the content of the compound is, in light of achievable effects, preferably 3,000 ppm, more preferably 2,000 ppm, still more preferably 1,500 ppm, and particularly preferably 1,000 ppm. A preferable process of adding the compound that has a conjugated double bond may include polymerizing as described above, followed by adding the compound prior to the saponification described above, in light of the improvement of the surface smoothness and extrusion stability. Although the reason is not necessarily clarified, the compound that has a conjugated double bond is believed to serve in preventing EVOH from deterioration before the saponification and/or during the saponification reaction.

(Metal Salt)

The multilayered structure may include a metal salt in the resin composition constituting the resin layer. When the resin composition thus includes a metal salt, thermal stability of the multilayered structure is improved, and melt formability is also improved. Moreover, the interlayer adhesiveness between resin layers is improved. In addition, due to the improvement of the interlayer adhesiveness between resin layers, durability of the multilayered structure is further improved. Although the reason for such an improvement of the interlayer adhesiveness by a metal salt is not necessarily clear, it is deemed that an affinity of hydroxyl groups of the EVOH may be enhanced between resin layers resulting from the presence of the metal salt. Furthermore, in the case in which one of adjacent resin layers has a functional group capable of reacting with a hydroxyl group of the EVOH within its molecule, it is also considered that a bond formation reaction of the same may be accelerated due to the presence of the metal salt. It should be noted that the metal salt may be included in one or both of resin compositions of adjacent resin layers. The metal salt included in at least one of adjacent resin layers enables the aforementioned interlayer adhesiveness to be improved.

Although the metal salt is not particularly limited, an alkali metal salt, an alkaline earth metal salt or a metal salt of a d-block metal listed in group 4 of periodic table is preferred since the interlayer adhesiveness can be further enhanced. Among these, an alkali metal salt or an alkaline earth metal salt is more preferred, and an alkali metal salt is particularly preferred.

The alkali metal salt is not particularly limited, and examples thereof include aliphatic carboxylic acid salts, aromatic carboxylic acid salts, phosphoric acid salts, metal complexes of lithium, sodium, potassium, etc., and the like. Specific examples of the alkali metal salt include sodium acetate, potassium acetate, sodium phosphate, lithium phosphate, sodium stearate, potassium stearate, a sodium salt of ethylenediamine tetra acetic acid, and the like. Among these, sodium acetate, potassium acetate and sodium phosphate are particularly preferred, in light of being easily available.

The alkaline earth metal salt is not particularly limited, and examples thereof include acetic acid salts or phosphoric acid salts of magnesium, calcium, barium, beryllium, or the like. Among these, acetic acid salts or phosphoric acid salts of magnesium or calcium are particularly preferred, in light of being easily available. To include such an alkaline earth metal salt is also advantageous in capability of reducing the amount of adhesion to a die of a forming machine of the resin yielded by heat deterioration during melt forming.

Although the metal salt of a d-block metal listed in group 4 of periodic table is not particularly limited, example thereof include carboxylic acid salts, phosphoric acid salts or acetylacetonato salts of titanium, vanadium, chromium, manganese, iron, cobalt, nickel, copper, zinc, etc., and the like.

The lower limit of the content of the metal salt (content in terms of metal element equivalent on the basis of the entire multilayered structure) is 1 ppm, more preferably 5 ppm, still more preferably 10 ppm, and particularly preferably 20 ppm. On the other hand, the upper limit of the content of the metal salt is 10,000 ppm, more preferably 5,000 ppm, still more preferably 1,000 ppm, and particularly preferably 500 ppm. When the content of the metal salt is less than the lower limit described above, the interlayer adhesiveness may be inferior, and thus the durability of the multilayered structure may be deteriorated. To the contrary, when the content of the metal salt is beyond the upper limit described above, coloring of the resin composition may be significant, whereby the appearance of the multilayered structure may be deteriorated.

The metal salt may be included in the resin composition by any method, which is not particularly limit, and a method similar to one for including a phosphate compound or the like in the resin composition of the resin layer as described above may be employed.

The resin composition constituting the resin layer may contain in addition to the aforementioned metal salt and the like any of various components other than EVOH. As such a component other than EVOH, for example, an oxygen scavenger, a desiccant and the like may be included.

The oxygen scavenger is a substance having an oxygen scavenging ability (oxygen absorbing function). The oxygen scavenging ability as referred to means a function of absorbing and consuming oxygen from a given environment, or decreasing the amount of oxygen. The oxygen scavenger which may be contained in the resin composition constituting the resin layer is not particularly limited as long as it has such properties. By containing the oxygen scavenger in the resin composition of the resin layer in addition to the EVOH, the gas barrier properties of the multilayered structure can be further improved as a result of addition of oxygen scavenging ability. As the oxygen scavenger, various types of substances may be used, examples thereof include organic oxygen scavengers such as a thermoplastic resin having an oxygen scavenging ability or ascorbic acid; inorganic oxygen scavengers such as iron or a sulfurous acid salt, and the like. Of these, a thermoplastic resin having an oxygen scavenging ability is preferred since superior oxygen scavenging property is provided, and it can be easily contained in the resin composition of the multilayered structure.

<Thermoplastic Resin Having Oxygen Scavenging Ability>

The thermoplastic resin having an oxygen scavenging ability is not particularly limited as long as it is a thermoplastic resin capable of scavenging oxygen, and examples include ethylene based unsaturated hydrocarbon polymers having a carbon-carbon double bond, or polymer blends (other than those having a molecular weight of no greater than 1,000 and having a conjugated double bond), hereinafter, may be also referred to as merely "unsaturated hydrocarbon polymer", and the like.

<Unsaturated Hydrocarbon Polymer>

The unsaturated hydrocarbon polymer may have a substituent, or may be unsubstituted. The unsubstituted unsaturated hydrocarbon polymer is defined as an arbitrary compound having at least one aliphatic carbon-carbon double bond and consisting of 100% by mass carbon and hydrogen in total. Also, the substituted unsaturated hydrocarbon polymer is defined as an ethylene based unsaturated hydrocarbon having at least one aliphatic carbon-carbon double bond and including about 50 to 99% by mass carbon and hydrogen in total. Preferable unsubstituted or substituted unsaturated hydrocarbon polymer has at least two ethylene based unsaturated groups per molecule. More preferably, the unsubstituted or substituted unsaturated hydrocarbon polymer is a polymer compound having at least two ethylene-based unsaturated groups, and a mass average molecular weight of equal to or greater than 1,000. The polymer blend of the ethylene based unsaturated hydrocarbon may be composed of a mixture of 2 types or more types of substituted or unsubstituted ethylene based unsaturated hydrocarbons.

Examples of preferable unsubstituted unsaturated hydrocarbon polymer include the followings, but not limited thereto:

diene polymers such as polyisoprene, (e.g., trans-polyisoprene), polybutadiene (e.g., 1,2-polybutadiene), and copolymers of the same (e.g., styrene-butadiene);

polypentenamers, polyoctenamers, and other polymers produced by double decomposition of an olefin; diene oligomers such as squalene; polymers or copolymers derived from dicyclopentadiene, norbornadiene, 5-ethylidene-2-norbornene, or other monomer that includes at least two carbon-carbon double bonds (conjugated or unconjugated);

carotenoids such as β-carotene; and the like.

Preferable substituted unsaturated hydrocarbon polymer may include those having an oxygen-containing moiety, such as e.g., ester, carboxylic acid, aldehyde, ether, ketone, alcohol, peroxide, and/or hydroperoxide, but not limited thereto. Specific examples of such hydrocarbon include condensed polymers such as e.g., polyesters derived from a monomer that includes a carbon-carbon double bond; unsaturated fatty acids such as e.g., oleic acid, ricirioleic acid, dehydrationricinoleic acid and linoleic acid, and derivatives thereof such as e.g., esters, but not limited thereto. The hydrocarbons may involve (meth)allyl (meth) acrylate.

In the unsaturated hydrocarbon polymer, the content of the carbon-carbon double bond is preferably 0.01 to 1.0 equivalent with respect to 100 g of the polymer. When the content of the double bonds in the polymer is limited to fall within such a range, both the oxygen scavenging property and physical property of the multilayered structure can be maintained to be superior.

The polymer including thus decreased double bonds can be a blend of homopolymer, copolymer, and/or polymer. A polymer blend is particularly desired since a change of physical properties in a discontinuous phase has comparatively small influences exerted on the entire physical properties of the blend which would predominantly have a continuous phase, and thus it is desired that a majority of existing double bonds are included in the discontinuous phase.

Suitable examples of the homopolymer include poly (octenamer) having 0.91 equivalent of double bonds in 100 g of the polymer, and poly(4-vinylcyclohexene) having 0.93 equivalent of double bonds in 100 g of the polymer. Examples of suitable copolymer include $C_1$-$C_4$alkylacrylate and methacrylate. Other examples include copolymers derived from 1,3-butadiene, isoprene, 5-ethylidene-2-norbornene, 4-vinylcyclohexene, 1,4-hexadiene, 1,6-octadiene or the like with one, or two or more types of vinyl monomers such as e.g., ethylene, propylene, styrene, vinyl acetate, and/or α-olefin. Specific examples include terpolymers of ethylene, propylene and 5-ethylidene-2-norbornene. Such EPDM elastomers typically contain 3 to 14% by mass 5-ethylidene-2-norbornene. These polymers comply with the aforementioned requirements for the double bonds, i.e., falling within the range of 0.01 to 1.0 equivalent in 100 g of the polymer. Also, partially hydrogenated ethylene based unsaturated polymers (for example, polybutadiene), which include at least about 50% hydrogenated double bonds, are suitable. Exemplary polymer blend may vary widely. Blends of EPDM and 20 to 40% polybutadiene, blends of EPDM and 20 to 40% poly(octenamer), and blends of polybutadiene and saturated polyolefin at 50/50 are particularly preferred.

<Thermoplastic Resin Having Carbon-Carbon Double Bonds Substantially in Only the Main Chain>

Among the aforementioned unsaturated hydrocarbon polymers, in light of very superior oxygen scavenging properties and possibility to be included in the resin composition of the multilayered structure, (D) thermoplastic resins having carbon-carbon double bonds substantially in only the main chain (hereinafter, may be also referred to as merely "thermoplastic resin (D)"), except for those having a molecular weight of no greater than 1,000 and having conjugated double bonds, are particularly preferred. In this regard, the thermoplastic resin (D) "having carbon-carbon double bonds substantially in only the main chain" as referred to herein means that the carbon-carbon double bonds existing in the main chain of the thermoplastic resin (D) account for no less than 90% of all the carbon-carbon double bonds included in the main chain or side chain of the molecule. The carbon-carbon double bonds existing in the main chain account for preferably no less than 93%, and more preferably no less than 95%.

Since the thermoplastic resin (D) having double bonds has carbon-carbon double bonds in the molecule thereof, it can efficiently react with oxygen, whereby superior oxygen scavenging ability can be achieved. By including such a thermoplastic resin (D) in the resin composition constituting the resin layer, the gas barrier properties of the multilayered structure can be significantly improved. The carbon-carbon double bond involves conjugated double bonds, but does not involve multiple bonds included in an aromatic ring.

The lower limit of the content of carbon-carbon double bonds included in the thermoplastic resin (D) is preferably 0.001 equivalent/g, more preferably 0.005 equivalent/g, and still more preferably 0.01 equivalent/g. On the other hand, the upper limit of the content of the carbon-carbon double bonds is preferably 0.04 equivalent/g, more preferably 0.03 equivalent/g, and still more preferably 0.02 equivalent/g. When the content of the carbon-carbon double bond is less than the lower limit described above, the multilayered structure obtained may have insufficient oxygen scavenge function. To the contrary, when the content of the carbon-carbon double bonds is beyond the upper limit described above, coloring of the resin composition may be significant, whereby the appearance of the multilayered structure obtained may be deteriorated.

As described in the foregoing, the thermoplastic resin (D) having double bonds is, due to having carbon-carbon double bonds substantially in only the main chain, accompanied by significantly less generation of decomposed matter having low molecular weights yielded upon cleavage of side chain double bonds by way of a reaction with oxygen. Although a part of the decomposed matter having low molecular weights is an unpleasant odor substance, development of unpleasant odor can be minimized as such decomposed matter is less likely to be generated. Therefore, by including such a thermoplastic resin (D) constituting the resin layer in the resin composition, a multilayered structure can be provided having superior gas barrier properties and durability, while avoiding from development of unpleasant odor, by means of the oxygen scavenge. In this respect, when a thermoplastic resin having many of the carbon-carbon double bonds in the side chain is used, oxygen scavenging properties may be satisfactory; however, decomposed matter is generated upon cleavage of the double bonds in the side chain as described above. Thus, unpleasant odor is developed, whereby surrounding environment may be significantly compromised.

In the thermoplastic resin (D), when the carbon-carbon double bond in the main chain reacts with oxygen, oxidization occurs at a site of allyl carbon (carbon adjacent to the double bond); therefore, allyl carbon is preferably other than quaternary carbon. Furthermore, since it would be possible to generate decomposed matter having low molecular weights even if the main chain is cleaved, the allyl carbon is preferably unsubstituted carbon, i.e., methylene carbon in order to prevent this event. From the foregoing respects, the thermoplastic resin (D) preferably has at least one of units represented by the following formulae (X) and (XI).

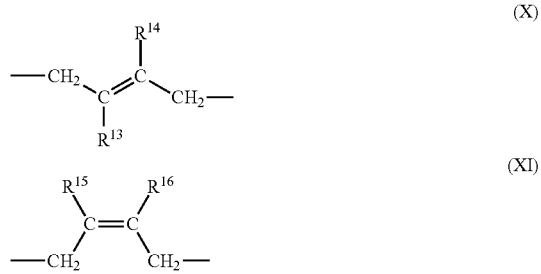

In the above formula (X) and (XI), $R^{13}$, $R^{14}$, $R^{15}$ and $R^{16}$ each independently represent a hydrogen atom, an alkyl group which may have a substituent, an aryl group which may have a substituent, an alkylaryl group which may have a substituent, —COOR$^{17}$, —OCOR$^{18}$, a cyano group or a halogen atom; $R^{15}$ and $R^{16}$ may form a ring by way of a methylene group or an oxymethylene group, wherein in a case in which both $R^{15}$ and $R^{16}$ represent a hydrogen atom, the $R^{15}$ and $R^{16}$ do not bind with one another; $R^{17}$ and $R^{18}$ represent an alkyl group which may have a substituent, an aryl group which may have a substituent or an alkylaryl group which may have a substituent.

When $R^{13}$, $R^{14}$, $R^{15}$ and $R^{16}$ represent an alkyl group, the alkyl group has preferably 1 to 5 carbon atoms; when they represent an aryl group, the aryl group has preferably 6 to 10 carbon atoms; and when they represent an alkylaryl group, the alkylaryl group has preferably 7 to 11 carbon atoms. Specific examples of the alkyl group include a methyl group, an ethyl group, a propyl group and a butyl group; specific examples of the aryl group include a phenyl group; examples of the alkylaryl group include a tolyl group; and examples of the halogen atom include a chlorine atom.

The substituent which may be included in the thermoplastic resin (D) is exemplified by various types of hydrophilic groups. The hydrophilic group as referred to herein is exemplified by a hydroxyl group, an alkoxy group having 1 to 10 carbon atoms, an amino group, an aldehyde group, a carboxyl group, a metal carboxylate group, an epoxy group, an ester group, a carboxylic anhydride group, a boronic acid group, a boron-containing group that can be converted into a boronic acid group in the presence of water (for example, boronic acid ester group, a boronic acid anhydride group, a boronic acid base, etc.), and the like. Among these hydrophilic groups, an aldehyde group, a carboxyl group, a metal carboxylate group, an epoxy group, an ester croup, a carboxylic anhydride group, a boronic acid group, a boron-containing group that can be converted into a boronic acid group in the presence of water are preferred in terms of ability to react with a hydroxyl group of EVOH. When the thermoplastic resin (D) includes such a hydrophilic group, the thermoplastic resin (D) has elevated dispersibility in the resin composition containing EVOH of the resin layer, thereby leading to improvement of the oxygen scavenging function of the multilayered structure obtained. In addition, along with this phenomenon, the interlayer adhesiveness of the resin layers is improved as a result of formation of a chemical bond through a reaction of this hydrophilic group with a hydroxyl group of EVOH in the adjacent resin layer, and characteristics such as gas barrier properties and durability of the resultant multilayered structure are further improved.

In addition, of the thermoplastic resins (D) in the foregoing, compounds having the unit represented by the above formulae (X) and (XI) of the resin, wherein $R^{13}$, $R^{14}$, $R^{15}$ and $R^{16}$ all represent a hydrogen atom are particularly preferred in light of prevention of the odor. Although the reason for the prevention is not necessarily clarified, it is presumed that when $R^{13}$, $R^{14}$, $R^{15}$ and $R^{16}$ represent not a hydrogen atom but a group listed, the group may be oxidized and cleaved to convert into an odor substance, when the thermoplastic resin (D) reacts with oxygen.

In the thermoplastic resin (D), the unit represented by the above formula (X) and (XI) is preferably a unit derived from a diene compound. When the unit is derived from a diene compound, the thermoplastic resin having such a structural unit can be readily produced. The diene compound is exemplified by isoprene, butadiene, 2-ethylbutadiene, 2-butylbutadiene, chloroprene, and the like. Only one of these may be used alone, or a plurality of types thereof may be used in combination. Examples of the thermoplastic resin (D) that includes such a unit derived from a diene compound include polybutadiene, polyisoprene, polychloroprene, polyoctenylene, and the like. Of these, polybutadiene and polyoctenylene are particularly preferred in light of particularly superior oxygen scavenging function. Alternatively, a copolymer including as a copolymerization component a structural unit other than the aforementioned structural units can be used also as the thermoplastic resin (D). The copolymerization component is exemplified by styrene, acrylonitrile, propylene, and the like. When the thermoplastic resin (D) is such a copolymer, the content of the units represented by the above formulae (X) and (XI) is preferably no less than 50 mol %, and more preferably no less than 70 mol % in terms of the total number of the units with respect to the entire structural units of the thermoplastic resin.

The lower limit of the number average molecular weight of the thermoplastic resin (D) is preferably 1,000, more preferably 5,000, still more preferably 10,000, and particularly preferably 40,000. On the other hand, the upper limit of the number average molecular weight is preferably 500,000, more preferably 300,000, still more preferably 250,000, and particularly preferably 200,000. When the thermoplastic resin (D) has a molecular weight of less then 1,000, or greater than 500,000, the multilayered structure obtained may be involved in inferior forming processibility and handling quality, and mechanical properties of the multilayered structure such as strength and extensibility may be deteriorated. Moreover, the dispersibility in the resin composition constituting the resin layer is lowered, and as a result, gas barrier properties and oxygen scavenging performance of the multilayered structure may be deteriorated. The thermoplastic resin (D) may be used of one type or a plurality of types thereof.

The method for producing the thermoplastic resin (D) having carbon-carbon double bonds substantially in only the main chain as described above may vary depending on the type of the thermoplastic resin (D), and for example, polybutadiene (cis-1,4-polybutadiene) can be synthesized using a cobalt based or nickel based catalyst as a catalyst. Specific examples of the catalyst include a combination of a $CoCl_2 \cdot 2C_5H_5N$ complex and diethylaluminum chloride, and the like. The solvent which may be used includes an inert organic solvent, and in particular, hydrocarbon having 6 to 12 carbon atoms such as e.g., an alicyclic hydrocarbon such as hexane, heptane, octane or decane, or an aromatic hydrocarbon such as toluene, benzene or xylene is suitable. The polymerization is usually carried out at a temperature falling within the range of −78° C. to 70° C. for a time period falling within the range of 1 to 50 hours.

It is to be noted that the carbon-carbon double bonds that exist after completing the polymerization may be reduced by hydrogen in part in the range not to impair the mechanical properties of the multilayered structure, and effects such as gas barrier properties and oxygen scavenging performance, and the like. In this procedure, it is preferred that in particular, the carbon-carbon double bonds remaining in the side chain, in particular, are selectively reduced by hydrogen.

The content of the thermoplastic resin having an oxygen-scavenging ability in the resin composition is not particularly limited, and is preferably no less than 0.1% by mass and no greater than 30% by mass, and more preferably no less than 2% by mass and no greater than 20% by mass. When the content is less than the lower limit, the oxygen-scavenging ability may not be sufficiently exerted. To the contrary, when the content exceeds the upper limit, performances provided by the EVOH may not be sufficiently exerted.

The thermoplastic resin having an oxygen-scavenging ability is preferably included in the resin composition, in a state being dispersed in a particulate form (resin layer). When included in such a state, the oxygen-scavenging ability can be more effectively achieved while maintaining the performances of the EVOH. It is to be noted that the particle size in this procedure is, in light of more effectively achieved oxygen-scavenging ability, preferably no greater than 10 μm, more preferably no greater than 5 μm, and still more preferably no greater than 1 μm.

The resin composition constituting the resin layer preferably contains in addition to the aforementioned unsaturated hydrocarbon polymer (including the thermoplastic resin (D)), further (E) a transition metal salt (other than the metal salts described above). When such a transition metal salt (E) is included together with the unsaturated hydrocarbon polymer, the oxygen scavenging function of the multilayered structure obtained can be further improved, and as a result, further superior gas barrier properties can be provided. This event is believed to result from acceleration by the transition metal salt (E), of the reaction of the unsaturated hydrocarbon polymer with oxygen present inside of the multilayered structure or oxygen going to be permeabilized in the multilayered structure.

A transition metal ion that constitutes the transition metal salt (E) is exemplified by each ion of iron, nickel, copper, manganese, cobalt, rhodium, titanium, chromium, vanadium ruthenium, or the like, but not limited thereto. Of these, each ion of iron, nickel, copper, manganese or cobalt is preferred, each ion of manganese or cobalt is more preferred, and cobalt ion is particularly preferred.

A counter anion of the transition metal ion that constitutes the transition metal salt (E) is exemplified by carboxylic acid ion or halogen anion, and the like. Specific examples of the counter anion include: anions generated by ionization of a hydrogen ion from acetic acid, stearic acid, acetyl acetone, dimethyldithiocarbamic acid, palmitic acid, 2-ethylhexanoic acid, neodecanoic acid, linoleic acid, tol acid, oleic acid, resin acid, capric acid, naphthenoic acid or the like; a chloride ion and an acetyl acetonate ion, and the like, but not limited thereto. Specific examples of particularly preferred transition metal salt are cobalt 2-ethylhexanoate, cobalt neodecanoate and cobalt stearate. Also, the transition metal salt (E) may have a polymeric counter anion, and thus may be an ionomer, as generally referred to.

The lower limit value of the content of the transition metal salt (E) is in terms of metal element equivalent, preferably 1 ppm, more preferably 5 ppm, and still more preferably 10 ppm with respect to the resin composition constituting the resin layer. On the other hand, the upper limit value of the content of the transition metal salt (E) is preferably 50,000 ppm, more preferably 10,000 ppm, and still more preferably 5,000 ppm. The content of the transition metal salt (E) is less than the lower limit described above, the oxygen scavenge effect of the multilayered structure obtained may be insufficient. On the other hand, when the content of the transition metal salt (E) is beyond the upper limit described above, the thermal stability of the resin composition constituting the resin layer is deteriorated, whereby generation of decomposed gas, and gel and/or degraded materials may be significantly developed.

(Desiccant)

The desiccant is a substance that absorbs moisture and is capable of eliminating the moisture from a given environment. The desiccant which may be contained in the resin composition of the multilayered structure is not particularly limited as long as it has such properties. By containing the desiccant in the resin composition of the resin layer, gas barrier properties of the resin layer containing EVOH can be maintained at a high level since a dry state is maintained.

Examples of suitable desiccant include, hydrate formative salts, i.e., salts that absorb moisture in the form of water of crystallization, in particular, phosphoric acid salts (excluding the phosphoric acid salts described above) and particularly anhydrides thereof in light of the aforementioned effects, as well as other hydrate formative salts such as e.g., salts such as sodium borate and sodium sulphate, and particularly anhydrides of the same. Alternatively, other moisture absorptive compound such as e.g., sodium chloride, sodium nitrate, sugar, silica gel, bentonite, molecular sieve, a high-water-absorbing resin or the like may be also used. These may be used either alone or a plurality of types thereof.

The desiccant is preferably dispersed in the form of fine particles in a matrix of the resin-layer including EVOH. In particular, it is advantageous that a volume-surface mean diameter of the particles having a longitudinal diameter of no less than 10 μm of the desiccant particles is no greater than 30 μm, suitably 25 μm, and most suitably no greater than 20 μm, whereby a multilayered structure having a high level of gas barrier properties which have not been achievable so far can be obtained owing to a finely dispersed state formed. The composition having such a finely dispersed state can be attained, provided that especial processing methods to meet needs are carefully combined. In connection with the desiccant particles in the resin composition that constitutes the resin layer, the volume-surface mean diameter of the particles having a longitudinal diameter of no less than 10 μm has great influences on the gas barrier properties of the multilayered structure that includes the resin composition in its layer(s). Although the reason for this phenomenon is not necessarily clarified, it is presumed that particles having a large particle size have particularly disadvantageous effects on moisture absorption effects or the gas barrier properties of the EVOH.

The ratio of the EVOH constituting the resin layer to the desiccant used is not particularly limited, and the mass ratio preferably falls within the range of 97:3 to 50:50, and particularly 95:5 to 70:30.

Of the desiccants described above, phosphoric acid salts (excluding the phosphoric acid salts described above) that can form a hydrate are particularly preferred. Since many phosphoric acid salts can form a hydrate containing a plurality of water molecules in the form of crystals of water, the mass of water absorbed per unit mass is great, thereby capable of significantly contributing to improvement of the gas barrier properties of the multilayered structure. In addition, since the number of molecules of water of crystallization capable of including the phosphoric acid salt is likely to increase stepwise in accordance with elevation of the humidity, the moisture can be gradually absorbed according to the variation of the humidity in the environment.

Illustrative examples of the phosphoric acid salt include sodium phosphate ($Na_3PO_4$) trilithium phosphate ($Li_3PO_4$), disodium hydrogenphosphate ($Na_2HPO_4$), sodium dihydrogenphosphate ($NaH_2PO_4$), polysodium phosphate, lithium phosphate, dilithium hydrogenphosphate, lithium dihydrogenphosphate, lithium polyphosphate, potassium phosphate, dipotassium hydrogenphosphate, potassium dihydrogenphosphate, disodium hydrogenphosphate, potassium polyphosphate, calcium phosphate ($Ca_3(PO_4)_2$), calcium hydrogenphosphate ($CaHPO_4$), calcium dihydrogenphosphate ($Ca(H_2PO_4)_2$), polycalcium phosphate, ammonium phosphate, diammonium hydrogenphosphate, ammonium dihydrogenphosphate, polyammonium phosphate, and the like. The polyphosphate as herein referred to includes diphosphate (pyrophosphoric acid salts), triphosphate (tripolyphosphoric acid salts), and the like. Of these phosphoric acid salts, anhydrides not containing water of crystallization are suitable. Also, sodium phosphate, disodium hydrogenphosphate, and sodium dihydrogenphosphate are suitable.

The phosphoric acid salts are usually in the form of powder. Commercially available powders of phosphoric acid salts generally have a mean particle diameter of 15 to 25 μm, and the size of maximum particles included is 40 to 100 μm. If a powder including such large particles is used, the gas barrier properties of the resin-layer of the multilayered structure may be insufficient. When particles having a size greater than the thickness of the resin-layer of the multilayered structure are included, gas barrier properties may be significantly impaired. Therefore, the particle size of the phosphoric acid salt powder is preferably no greater than the thickness of the resin-layer of the multilayered structure.

In other words, the phosphoric acid salt powder preferably has a mean particle diameter of no greater than 10 μm. The mean particle diameter is more preferably no greater than 1 μm. The mean particle diameter may be determined by, for example, a light scattering method or the like using a particle size analyzer.

When the phosphoric acid salt is used as a desiccant, it is preferably blended together with a dispersant. When such a dispersant is blended, the phosphoric acid salt as a desiccant can be favorably dispersed in the resin composition containing the EVOH. Examples of the dispersant include, fatty acid salts, glycerin fatty acid esters, fatty acid amides, and the like. It is to be noted that glycerin esters of aromatic carboxylic acids are generally in the form of a liquid at room temperature, and thus are not suited for dry blend with a phosphoric acid salt.

The fatty acid salt is exemplified by calcium stearate, zinc stearate, magnesium stearate, and the like. The glycerin fatty acid ester is exemplified by glycerin monostearic acid ester, monodecanoyl octanoyl glyceride, and the like. The fatty acid amide is exemplified by ethylene bisstearic acid amide, and the like.

Of these dispersants, a fatty acid salt is suitably used in light of improvement of slipping properties of phosphoric acid salt powder, and prevention of clogging of a screen of an extruder during melt kneading. Of thee, a calcium salt, a zinc salt, and the like are suitable. Furthermore, in light of achievement of particularly favorable dispersibility, a glycerin fatty acid ester is suitably used. In particular, a mono or difatty acid ester of glycerin is preferred, glycerin monofatty acid ester is more preferred, and glycerin monostearic acid ester is particularly preferred.

Moreover, the dispersant preferably consists of a compound having 8 to 40 carbon atoms. Due to having the number of carbon atoms falling within this range, favorable dispersibility can be achieved. The lower limit value of suitable number of carbon atoms is 12, and the upper limit value of suitable number of carbon atoms is 30.

The amount of the dispersant blended is preferably 1 to 20 parts by mass with respect to 100 parts by mass of the phosphoric acid salt. When the content of the dispersant is less than 1 part by mass with respect to 100 parts by mass of the phosphoric acid salt, prevention of generation of aggregates of the phosphoric acid salt fails. The content of the dispersant is suitably no less than 2 parts by mass, and more suitably no less than 3 parts by mass. On the other hand, when the content of the dispersant is greater than 20 parts by mass with respect to 100 parts by mass of the phosphoric acid salt, the slippage of the pellet of the resin composition becomes so great to result in difficulty in feeding to the extruder, whereby the interlayer adhesive strength is impaired in producing the multilayered structure. The content of the dispersant is suitably no greater than 15 parts by mass, and more suitably no greater than 10 parts by mass.

The resin composition constituting the resin layer may contain in addition to the aforementioned components, various additives such as a resin other than the EVOH, or a heat stabilizer, an ultraviolet ray absorbing agent, an antioxidant, a colorant and a filler in the range not to impair the object of the present invention. When the resin composition constituting the resin layer contains such additives other than the components described above, the amount is preferably no greater than 50% by mass, more preferably no greater than 30% by mass, and particularly preferably no greater than 10% by mass with respect to the total amount of the resin composition.

It is preferred that the resin composition of the resin layer has a melt viscosity ($\eta_1$) as determined at a temperature of 210° C. and a shear rate of 10/sec being no less than $1\times10^2$ Pa·s and no greater than $1\times10^4$ Pa·s and a melt viscosity ($\eta_2$) as determined at a temperature of 210° C. and a shear rate of 1,000/sec being no less than $1\times10^1$ Pa·s and no greater than $1\times10^3$ Pa·s, and a ratio ($\eta_2/\eta_1$) of the melt viscosity satisfies the following formula (1):

$$-0.8 \leq (1/2)\log_{10}(\eta_4/\eta_1) \leq -0.1 \quad (1).$$

When the melt viscosity ($\eta_1$) is less than $1\times10^2$ Pa·s, uneven flow of the resin is generated in film formation by extrusion such as lamination with melt coextrusion or melt extrusion, and thus obtaining a multilayered structure having a uniform and favorable appearance may be difficult. In addition, neck-in and shaking of the film may be significant, thereby enhancing thickness variation and width reduction of the obtained multilayered structure and the resin layer before the lamination, and thus it may be impossible to obtain a multilayered structure that is uniform and has a size intended. To the contrary, also when the melt viscosity ($\eta_1$) is beyond $1\times10^4$ Pa·s, uneven flow of the resin grows in film formation by extrusion such as lamination with melt coextrusion or melt extrusion, and thus obtaining a multilayered structure having a uniform and favorable appearance may be difficult. In addition, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin multilayered structure or the resin layer before the lamination may be difficult.

In addition, when the melt viscosity ($\eta_{2A}$) is less than $1\times10^1$ Pa·s, extrusion unevenness of the resin is generated in film formation by extrusion such as lamination with melt coextrusion or melt extrusion, whereby obtaining a multilayered structure having a uniform and favorable appearance may be difficult. In addition, neck-in and shaking of the film may be significant, thereby enhancing thickness variation and width reduction of the obtained multilayered structure and the resin layer before the lamination. To the contrary, when the melt viscosity ($\eta_2$) is beyond $1\times10^3$ Pa·s, a torque applied to the extruder becomes too high, and thus extrusion unevenness and weld line may be likely to be generated.

Moreover, when a value $(1/2)\log_{10}(\eta_2/\eta_1)$ calculated from the ratio ($\eta_2/\eta_1$) of the melt viscosity is less than −0.8, film cleavage is likely to occur in film formation by extrusion such as lamination with melt coextrusion or melt extrusion, whereby high-speed film formability may be deteriorated. On the other hand, when the value $(1/2)\log_{10}(\eta_2/\eta_1)$ is beyond −0.1, neck-in and shaking of the film occur in film formation by extrusion such as lamination with melt coextrusion or melt extrusion, whereby thickness variation and width reduction may occur in the obtained multilayered structure and the resin layer before the lamination. In these regards, the value of $(1/2)\log_{10}(\eta_2/\eta_1)$ is more preferably no less than −0.6, and still more preferably no greater than −0.2. It is to be noted that the value $(1/2)\log_{10}(\eta_2/\eta_1)$ in the above formula is determined in a natural double-logarithmic graph of the melt viscosity along the ordinate with respect to the shear rate along the abscissa, as a slope of a line drawn by connecting two points of the melt viscosity ($\eta_1$) and the melt viscosity ($\eta_2$). Also, values of the melt viscosity ($\eta_1$) and melt viscosity ($\eta_2$) as referred to herein are determined by a method described in the Examples below.

The resin composition of the resin layer preferably has, in connection with a relationship between the melt kneading time and the torque at least one point of a temperature that is higher than its melting point by 10 to 80° C., a value of viscosity behavioral stability ($M_{100}/M_{20}$, wherein $M_{20}$ represents a torque determined 20 min after starting kneading, and $M_{100}$ represents a torque determined 100 min after starting kneading) falling within the range of 0.5 to 1.5. As the value of the viscosity behavioral stability is approximate to 1, superior thermal stability (long run property) is indicated, with less change in the viscosity.

<Relationship Among Resin Layers>

In the multilayered structure, the resin layer constituted with a resin composition containing EVOH is not particularly limited as long as EVOH is contained. The multilayered structure may be, for example, configured with a resin layer constituted with an identical resin composition, or include resin layers constituted with resin compositions, respectively, that are different with one another in terms of at least one selected from the group consisting of the formulation, the blend ratio and the structure of the EVOH. The identical resin composition means that the formulation, the blend ratio and the structure of the EVOH are substantially the same between resin compositions. When adjacent at least 4 resin-layers in the multilayered structure are formed from an identical resin composition, the multilayered structure is preferred since the interlayer adhesiveness is improved, and durability enabling very superior gas barrier properties, etc., to be maintained is further improved. In addition, the number of types of the resin composition to be a basic material of the multilayered structure can be reduced, and a multilayered structure having such very superior gas barrier properties and high durability can be conveniently produced. It is more preferred that all resin layers of the multilayered structure are formed with an identical resin composition.

The aforementioned resin compositions that are different in terms of at least one selected from the group consisting of the formulation, the blend ratio and the structure of the EVOH as referred to herein means resin compositions containing EVOH having each different structure, compositions containing each different component other than the EVOH in terms of the type and/or the content, or any combination of these. The difference of the structure of the EVOH may include specifically, the content of ethylene units, the saponification degree, the polymerization degree, the type or the content of a structural unit other than an ethylene unit and a vinyl alcohol unit, or the type or the content of a functional group included in the EVOH, and the like. In addition, although the type of the component other than the EVOH is not particularly limited, for example, a metal salt, an oxygen scavenger, a desiccant, a resin other than the EVOH, a heat stabilizer, an ultraviolet ray absorbing agent, an antioxidant, a colorant, a filler, and the like may be included. In these regards, the case in which resin compositions are different in terms of the content of a component other than the EVOH include any case in which one a resin composition of one layer does not included the component included in another layer.

Provided that the multilayered structure thus has two types of resin layers that are different with one another in terms of at least one selected from the group consisting of the formulation, the blend ratio and the structure of the EVOH, these resin layers are designated as A layer and B layer. Due to having the layer A and the layer B as defined, characteristics such as gas barrier properties of the multilayered structure can be adjusted by selecting the structure of the EVOH and the type and/or the content of a component other than the EVOH in each layer A and layer B to be different with one another. In addition, a multilayered structure which further has additional various characteristics other than these characteristics may be also produced.

The order of lamination of the layer A and the layer B in the multilayered structure is not particularly limited, and in preferable modes of the configuration, at least a site including the layer A and the layer B being adjacent with each other is formed for efficiently achieving a synergistic effect based on a complementary correlation between respective functions of the layer A and the layer B as well as the interlayer adhesiveness of between the two layers, and the like. For example, the order of lamination such as:

(1) A, B, A, B . . . A, B (i.e., $(AB)_n$);
(2) A, B, A, B . . . A (i.e., $(AB)_nA$);
(3) B, A, B, A . . . B (i.e., $(BA)_nB$); and
(4) A, A, B, B . . . B, B (i.e., $(AABB)_n$)

may be employed. Also, in addition to the layer A and the layer B, when C layer is included which is constituted with a resin composition containing EVOH and being different from the layer A and the layer B in terms of at least one selected from the group consisting of the formulation, the blend ratio and the structure of the EVOH, for example, the order of lamination such as:

(5) A, B, C . . . A, B, C (i.e., $(ABC)_n$) may be employed.

In particular, according to preferable orders of lamination of the layer A and layer B, the layer A and the layer B are alternately laminated as in the above (1), (2) or (3). Thus alternately laminated structure enables a synergistic effect by the layer A and the layer B to be achieved at the entirety of the interlayer, and enables characteristics resulting from the synergistic effect to be efficiently exhibited. Furthermore, the interlayer adhesive strength can be exerted at the entirety of the interlayer, whereby defects such as interlayer delamination can be reduced. As a result, improvement of characteristics of the multilayered structure such as gas barrier properties and durability of the characteristics is enabled.

By laminating at least 4 layers in total of two types of the layers including the layer A and the layer B constituted with a resin composition containing EVOH, a multilayered structure having very superior gas barrier properties, stretchability and thermoformability in combination can be provided. In addition, a multilayered structure can be provided that is capable of maintaining gas barrier properties even if used with repeated deformation such as stretching or flexion imposed, owing to the laminated configuration of the layer A and the layer B. In addition to the two layer of the layer A and the layer B, the multilayered structure may have the layer C, etc., which is constituted with a resin composition containing EVOH and being different from the layer A and the layer B in terms of at least one selected from the group consisting of the formulation, the blend ratio and the structure of the EVOH.

Due to each different structure of the EVOH constituting the layer A and the layer B, gas barrier properties, stretchability and thermoformability of the obtained multilayered structure can be adjusted or improved. For example, when the content of ethylene units of the EVOH constituting the layer A is different from that of the EVOH constituting the layer B, the stretchability and thermoformability of the multilayered structure can be further improved, whereby a multilayered structure that can be easily applied to a variety of use can be provided. The lower limit of the difference between the contents of ethylene units of the EVOHs of the layer A and of the layer B in such a case is preferably 3 mol %, more preferably 5 mol %, and still more preferably 7 mol %. On the other hand, the upper limit of the difference between the contents of ethylene units of the EVOHs of the layer A and of the layer B is preferably 70 mol %, more preferably 50 mol %, and still more preferably 30 mol %. When the difference between the contents of ethylene is less than this lower limit, the degree of improvement of the stretchability and thermoformability of the multilayered structure may be unsatisfactory. To the contrary, when the difference between the contents of ethylene units is beyond this upper limit, the stretchability of the multilayered structure tends to be rather deteriorated.

In the multilayered structure having the layer A and the layer B, a component other than the EVOH may be included also in only one resin composition of the layer A and the layer B. By thus including the component other than the EVOH in only one of the layer A and the layer B, even if the component may deteriorate the characteristics of the multilayered structure, relevant disadvantages can be minimized. In addition, achieving an advanced function is enabled byway of a synergistic effect owing to a complementary correlation between the layer containing the component other than the EVOH and the layer not containing the same.

For example, when a thermoplastic resin having an oxygen-scavenging ability, preferably an unsaturated hydrocarbon polymer and still more preferably the thermoplastic resin (D) is included in only one of the layer A and the layer B, diffusion of an odor component which is generated by oxygen scavenging in one layer containing the thermoplastic resin is suppressed by gas barrier properties of other layer not containing the thermoplastic resin; therefore, generation of an odor from the multilayered structure can be inhibited. Accordingly, while disadvantageous features of the oxygen scavenger included for the purpose of further enhancing very superior gas barrier properties of the multilayered structure are avoided, achieving further superior gas barrier properties is enabled.

Also, when a desiccant is contained in only one of the layer A and the layer B, although gas barrier properties may be impaired due to the presence of the desiccant in one layer containing the desiccant, impairment of the gas barrier properties can be restrained only in the layer containing the desiccant, whereas other layer not containing the desiccant is affected by a humidity-reducing effect resulting from the desiccant. Therefore, gas barrier properties can be improved in the entirety of the multilayered structure.

Such a synergistic effect by a complementary correlation of the layer A and the layer B is efficiently achieved as a result of contiguously arranged layer A and layer B, and is more efficiently achieved when the layer A and the layer B are alternately laminated.

With regard to the relationship of the viscosity of each resin composition that constitutes the layer A and the layer B, the lower limit of the ratio ($\eta_{2B}/\eta_{2A}$) of the melt viscosity ($\eta_{2B}$) of the resin composition of the layer B to the melt viscosity ($\eta_{2A}$) of the resin composition of the layer A as determined at a temperature of 210° C. and a shear rate of 1,000/sec is preferably 0.1, more preferably 0.25, and still more preferably 0.5. On the other hand, the upper limit of the ratio ($\eta_{2B}/\eta_{2A}$) is preferably 10, more preferably 4, and still more preferably 2. When the ratio ($\eta_{2B}/\eta_{2A}$) of the viscosity falls within the range described above, a state of the layer being uniform without generation of uneven flow is attained and thus the appearance of the multilayered structure becomes favorable in forming by a multilayer coextrusion process, and the adhesion between the layer A and the layer B becomes favorable, whereby the durability of the multilayered structure can be improved.

<Method for Producing the Multilayered Structure>

The method for producing a multilayered structure is not particularly limited as long as the method can favorably laminate and adhere the resin layers containing EVOH, and any of well-known methods such as e.g., coextrusion, pasting, coating, bonding, and attaching may be employed. The method for producing a multilayered structure is specifically exemplified by (1) a method for producing a multilayered structure by a multilayer coextrusion process using a resin composition containing EVOH, (2) a method for producing a multilayered structure having a resin layer containing EVOH, the method including: producing first a laminate including a resin layer containing EVOH by a coextrusion process using a resin composition containing EVOH; overlaying a plurality of laminates via an adhesive; and stretching, and the like. Among these, in light of superior productivity, and excellent interlayer adhesiveness, the method (1) of formation by a multilayer coextrusion process using two types of resin compositions containing EVOH is preferred.

In the multilayer coextrusion process, the multilayered structure is formed by: heat melting the resin composition containing EVOH; supplying the melted resin compositions into an extrusion die from each distinctive extruder and pump through each channel; extruding from the extrusion die to give a multilayer; and thereafter allowing for lamination and adhesion. As the extrusion die, for example, a multimanifold die, a field block, a static mixer, or the like may be used.

As described above, the multilayered structure has very superior gas barrier properties, and is excellent in stretchability, thermoformability, durability, and interlayer adhesiveness as well. Thus, the multilayered structure can be used in applications such as packaging materials for food and medical applications, etc., for which a high degree of protection of the contents from the external environment is required. Of these materials, the multilayered structure is suitably used for food packing materials for which particularly superior gas barrier properties, stretchability, durability, transparency and the like are desired.

<Laminate>

The laminate of the present invention is provided by further laminating a layer of a thermoplastic resin other than the EVOH on the multilayered structure. Hereinafter, a layer structure, a thermoplastic resin layer, a relationship between the multilayered structure and, the thermoplastic resin layer, and a method for producing the laminate are explained in this order.

<Layer Structure of the Laminate>

Due to having a layer of a thermoplastic resin other than the EVOH laminated on the multilayered structure, the laminate has a characteristic feature of capable having characteristics such as superior gas barrier properties, flex resistance and pinhole resistance resulting from the multilayered structure, in combination with various in combination with various functions such as heat sealing properties and release properties resulting from the thermoplastic resin layer. The thermoplastic resin layer may be laminated on both two faces of the multilayered structure, or one face of the same, and two or more thermoplastic resin layers may be also laminated. Also, the laminate may have at least two of the multilayered structures.

The lower limit of the average thickness of the laminate is preferably 1 µm, more preferably 10 µm, and still more preferably 50 µm. On the other hand, the upper limit of the average thickness of the laminate is preferably 5,000 µm, more preferably 3,000 µm, and still more preferably 2,000 µm. When the average thickness of the laminate is less than this lower limit, the strength of the laminate may be decreased. To the contrary, when the average thickness of the laminate is beyond this upper limit, flexibility, formability, etc., of the laminate may be insufficient, and the durability may be impaired.

<Thermoplastic Resin Layer>

The thermoplastic resin layer constituting the multilayered structure is a layer containing a thermoplastic resin other than the EVOH. Examples of the thermoplastic resin include various types of polyolefins (polyethylene, polypropylene, poly 1-butene, poly 4-methyl-1-pentene, ethylene-propylene copolymers, copolymers of ethylene with α-olefin having 4 or more carbon atoms, copolymers of polyolefin and maleic anhydride, ethylene-vinyl ester copolymers, ethylene-acrylate copolymer, or modified polyolefins prepared by grafting modification of the same with an unsaturated carboxylic acid or a derivative thereof), various types of nylon (nylon-6, nylon-6,6, nylon-6/6,6 copolymer, etc.), polyvinyl chloride, polyvinylidene chloride, polyesters, polystyrene, polyacrylonitrile, polyurethane, polyacetal and modified polyvinyl alcohol resins, and the like.

<Relationship Between Multilayered Structure and Thermoplastic Resin Layer>

The thermoplastic resin layer to be in contact with the outermost layer of the multilayered structure preferably has high adhesiveness with the resin layer that is the outermost layer, and particularly preferably has a molecular chain having a functional group capable of yielding a bond by a reaction with: a hydroxyl group that the EVOH in the resin layer has; and/or a functional group that the other component included in the resin layer has. In order to form such a resin layer, an adhesive resin is suitably used among the thermoplastic resins. Such an adhesive resin is exemplified by a product of grafting of an olefin-derived polymer or a copolymer (polyethylene (low density polyethylene, linear low density polyethylene, very low density polyethylene), an ethylene-vinyl acetate copolymer, an ethylene-(meth)acrylic acid ester (methyl ester or ethyl ester) copolymer) with an unsaturated carboxylic acid or an anhydride of the same (maleic anhydride, etc.), a boronic acid group, or a boron-containing group capable of being converted into a boronic acid group in the presence of water.

The resin composition of the layer positioned outermost of the multilayered structure preferably contains the at least one metal salt selected from the group consisting of an alkali metal salt, an alkaline earth metal salt and a metal salt of a group IV d-block element of the periodic table. By thus containing the metal salt in the resin composition of the outermost layer, the adhesiveness between the outermost layer of the multilayered structure and the thermoplastic resin layer can be improved, whereby a laminate having superior strength can be provided.

In addition, when the resin layer has the layer A and the layer B as described above, it is preferred that the metal salt is contained only in the resin composition of the layer positioned outermost among the layer A and the layer B. By containing of such a metal salt, the interlayer adhesiveness is improved, whereas thermal stability of the resin composition containing EVOH is affected. According to the laminate, since only one of the outermost layers of the multilayered structure contains the metal salt, and another layer does not contain the metal salt, thermal stability of the multilayered structure in the laminate can be improved. By including the metal salt only in the resin composition of the layer positioned outermost among the layer A and the layer B, thermal stability of the multilayered structure can be improved while improving the adhesiveness between the outermost layer of the multilayered structure with the adjacent thermoplastic resin layer; therefore, a laminate that is superior in thermal stability and has excellent strength can be provided.

<Method for Producing the Laminate>

The method for producing a laminate is not particularly limited, and a method of laminating the thermoplastic resin layer by a multilayer coextrusion process concomitantly with producing the multilayered structure, a method of laminating the thermoplastic resin layer on the multilayered structure by adhesion with an adhesive or by extrusion lamination, or the like may be adopted. In particular, a multilayer coextrusion process is preferred.

In addition, the laminate of the present invention may have a supporting layer further laminated on either one or both faces of the laminate. The supporting layer is not particularly limit, which may not be a resin layer, and for example, a general synthetic resin layer, a synthetic film or the like may be used. Also, laminating means of the supporting layer is not particularly limited, and adhesion by an adhesive, extrusion lamination, or the like may be employed.

As described above, the laminate has a characteristic feature of capable having very superior gas barrier properties, flex resistance and pinhole resistance, in combination with various functions such as heat sealing properties and release properties. Thus, the laminate can be used in applications such as packaging materials for food and medical applications, etc., for which a high degree of protection of the contents from the external environment is required and convenience of packing is desired. Of these materials, the laminate is suitably used for food packing materials for which particularly superior gas barrier properties, stretchability, durability, transparency and the like are desired.

EXAMPLES

Hereinafter, the present invention is explained in more specifically by way of Examples, but the present invention is not limited to the following Examples. In the following Examples, also in the case of a multilayered structure in which the resin compositions constituting the at least 4 resin-layers are identical, the first layer may be referred to as A layer and the second layer may be referred to as B layer, for the sake of simplicity. It is to be noted that in the following Production Example, the content of each component was quantitatively determined by the method described below.

(1) Acetic Acid

Dry EVOH pellet in an amount of 20 g was charged into 100 mL of ion exchanged water, and extracted under heating at 95° C. for 6 hours. The extracted liquid was subjected to neutralization titration with 1/50 N NaOH using phenolphthalein as an indicator, whereby the content of acetic acid was quantitatively determined.

(2) Metal Ion

The dry EVOH pellet was ground by freeze grinding. Thus obtained EVOH powder in an amount of 10 g and 50 mL of ion exchanged water were charged in a 100 mL stoppered Erlenmeyer flask equipped with a cooling condenser, and the mixture was stirred at 95° C. for 10 hours to execute heat extraction. Thus obtained extract in a volume of 2 mL was diluted with 8 mL of ion exchanged water. The amount of each metal ion in thus diluted extract was quantitatively determined using an ICP emission spectrophotometer "Optima 4300 DV" manufactured by PerkinElmer Japan Co., Ltd.

(3) Phosphate Compound

The dry EVOH pellet was ground by freeze grinding. Thus obtained EVOH powder in an amount of 1.0 g, 15 mL of concentrated nitric acid and 4 mL of concentrated sulfuric acid were charged into a stoppered 100 mL Erlenmeyer flask equipped with a cooling condenser to execute heat degradation at 200 to 230° C. Thus obtained solution was diluted to 50 mL with ion exchanged water in a volumetric flask. The solution was subjected to a quantitative analysis using an ICP emission spectrophotometer "Optima 4300 DV" manufactured by PerkinElmer Japan Co., Ltd., at an observation wavelength of 214.914 nm, whereby the amount of phosphorus element was quantitatively determined, and the amount of phosphate compounds was calculated to give a value of phosphate radical equivalent.

(4) Boron Compound

The dry EVOH pellet provided as a sample in an amount of 50 mg was completely combusted by an oxygen flask combustion method, and thus resultant combusted ash deposition was dissolved in 10 mL of a 1 mol/L aqueous nitric acid solution. The solution was subjected to a quantitative analysis using an ICP emission spectrophotometer "Optima 4300 DV" manufactured by PerkinElmer Japan Co., Ltd., at an observation wavelength of 249.667 nm, whereby the content of boron compounds was obtained in a value of boron element equivalent.

Synthesis Example

Synthesis of Polyoctenylene

Air in a 5 three-necked flask equipped with a stirrer and a thermometer was replaced with dry nitrogen, and thereafter 624 parts by mass heptane dissolving 110 parts by mass of cis-cyclooctene and 187 parts by mass of cis-4-octene were charged.

Next, a catalyst solution was prepared by dissolving 0.0424 parts by mass of [1,3-bis-(2,4,6-trimethylphenyl)-2-imidazolidinylidene]dichloro(phenylmethylene) (tricyclohexylphosphine)ruthenium in 3.00 parts by mass of toluene, and the solution was quickly added to the aforementioned heptane solution to allow for a ring-opening metathesis polymerization (ROMP) at 55° C. One hour later, an analysis with gas chromatography (manufactured by Shimadzu Corporation, GC-14B; column: manufactured by Chemicals Inspection & Testing Institute, Japan, G-100) was conducted to ascertain disappearance of cis-cyclooctene. Thereafter, 1.08 parts by mass of ethylvinyl ether were added, and the mixture was stirred for additional 10 minutes.

The resulting reaction liquid were added 600 parts by mass of methanol, and the mixture was stirred at 55° C. for 30 min, followed by allowing to stand still at 40° C. for 1 hour. After liquid separation was conducted, the underlayer (layer of methanol) was eliminated. Thereto were added 600 parts by mass of methanol again, and the mixture was stirred at 55° C. for 30 min, followed by allowing to stand still at 40° C. for 1 hour. After liquid separation was conducted, the underlayer (layer of methanol) was eliminated. Heptane in the heptane layer (upperlayer) was distilled off under vacuum, and further dried with a vacuum dryer at 1 Pa and 100° C. for 6 hours to give 93.7 parts by mass of a polymer (yield: 88%) having a weight average molecular weight (Mw) of 168,000 and a number average molecular weight (Mn) of 37,000. The proportion of carbon-carbon double bonds in the side chain of the polymer (polyoctenylene) with respect to the entire carbon-carbon double bonds was 0%

Production Example 1

Production of Pellet (A-1)

Into a polymerization tank equipped with a cooling device and a stirrer were charged 20,000 parts by mass of vinyl acetate, 2,000 parts by mass of methanol, 10 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 45 Kg/cm$^2$, and the temperature and the pressure were kept for 4 hours while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 45% with respect to vinyl acetate charged. The copolymerization reaction liquid was supplied to the purge column, and after unreacted vinyl acetate was eliminated from the top of the tower by introduction of methanol steam from the bottom of the tower, a 40% methanol solution of the copolymer was obtained. The copolymer had a content of ethylene units of 32.5 mol %, and a content of vinyl acetate units of 67.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-1) having a saponification degree of 99.5 mol %.

EVOH (A-1) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.05 g of sodium hydrogenphosphate and 0.35 g of orthoboric acid dissolved in 1 L), at a bath ratio of 20, followed by drying and pelletization with an extruder to give a pellet (A-1). The MFR of the pellet (A-1) was 3.8 g/10 min (210° C., under a load of 2,160 g). In addition, the pellet (A-1) had a content of acetic acid of 150 ppm, a content of sodium ion of 140 ppm, a content of the phosphate compound in terms of phosphoric radical equivalent of 45 ppm, and a content of the boron compound in terms of a boron equivalent value of 260 ppm.

Production Example 2

Production of Pellet (A-2)

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 59 Kg/cm$^2$, and the temperature and the pressure were kept for 4 hours while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-2) having a saponification degree of 99.5%.

EVOH (A-2) thus obtained was subjected to a treatment with an aqueous solution containing acetic acid, sodium acetate and sodium hydrogenphosphate (an aqueous solution containing 0.3 g of acetic acid, 0.2 g of sodium acetate, 0.05 g of sodium hydrogenphosphate and 0.03 g of orthoboric acid dissolved in 1 L), at a bath ratio of 20, followed by drying and pelletization with an extruder to give a pellet (A-2). The MFR of the pellet (A-2) was 11.5 g/10 min (210° C., under a load of 2,160 g). In addition, the pellet (A-2) had a content of acetic acid of 135 ppm, a content of sodium ion of 140 ppm, a content of the phosphate compound in terms of phosphoric radical equivalent of 40 ppm, and a content of the boron compound in terms of a boron equivalent of 10 ppm.

Production Example 3

Production of Pellet (A-3)

Into a polymerization tank equipped with a cooling device and a stirrer were charged 20,000 parts by mass of vinyl acetate, 2,000 parts by mass of methanol, 10 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 38 Kg/cm$^2$, and the temperature and the pressure were kept for 3.5 hours while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 52% with respect to vinyl acetate charged. The copolymerization reaction liquid was supplied to the purge column, and after unreacted vinyl acetate was eliminated from the top of the tower by introduction of methanol steam from the bottom of the tower, a 40% methanol solution of the copolymer was obtained. The copolymer had a content of ethylene units of 26.5 mol %, and a content of vinyl acetate units of 73.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-3) having a saponification degree of 99.8 mol %.

EVOH (A-3) thus obtained was subjected to a treatment with an aqueous solution containing acetic acid, sodium acetate, sodium hydrogenphosphate and orthoboric acid (OBA) (an aqueous solution containing 0.3 g of acetic acid, 0.02 g of sodium acetate, 0.005 g of sodium hydrogenphosphate and 0.15 g of orthoboric acid dissolved in 1 L), at a bath ratio of 20, followed by drying and pelletization with an extruder to give a pellet (A-3). The MFR of the pellet (A-3) was 6.4 g/10 min (210° C., under a load of 2,160 g). In addition, the pellet (A-3) had a content of acetic acid of 95 ppm, a content of sodium ion of 14 ppm, a content of the phosphate compound in terms of phosphoric radical equivalent of 5 ppm, and a content of the boron compound in terms of a boron equivalent value of 85 ppm.

Production Example 4

Production of Pellet (A-4)

EVOH (A-2) obtained similarly to Production Example 2 was subjected to a treatment with an aqueous solution containing acetic acid and sodium hydrogenphosphate (an aqueous solution containing 0.05 g of acetic acid, 0.02 g of sodium hydrogenphosphate and 0.04 g of orthoboric acid dissolved in 1 L), at a bath ratio of 20, followed by drying to give EVOH composition particles. The MER of the EVOH composition particles was 9.7 g/10 min (210° C., under a load of 2,160 g). In addition, the EVOH composition particles had a content of acetic acid of 40 ppm, a content of the phosphate compound in terms of phosphoric radical equivalent of 20 ppm, and a content of the boron compound in terms of a boron equivalent value of 14 ppm.

Using the EVOH composition particles obtained as described above, epoxypropane was allowed to react with EVOH by means of a biaxial extruder "TEM-35BS" (37 mmϕ, L/D=52.5) manufactured by Toshiba Machine Co., Ltd. under the extrusion conditions as in the following while adding a catalyst. Unreacted epoxypropane was eliminated from a vent, and then a 8.2% by mass aqueous ethylenediamine tetraacetate trisodium hydrate solution was added as a catalyst quencher to permit pelletization, followed by drying to give a pellet (A-4) that includes epoxypropane-modified ethylene-vinyl alcohol copolymer EVOH (A-4) having a structural unit (ii) represented by the following formula as a structural unit (II) other than the ethylene unit and the vinyl alcohol unit.

Cylinder, die temperature settings:
cylinder part resin feed port/cylinder part/adaptor/die=160/200/240/240 (° C.)
Screw rotation speed: 400 rpm
Ethylene-vinyl alcohol copolymer feed rate: 16 kg/hr
Epoxypropane feed rate: 2.4 kg/hr (pressure during feeding: 6 MPa)
Catalyst solution feed rate: 0.32 kg/hr
Preparation of catalyst: Zinc acetylacetonato monohydrate in an amount of 28 parts by mass in was mixed with 957 parts by mass of 1,2-dimethoxyethane to give a mixed solution. To thus resulting mixed solution were added 15 parts by mass of trifluoromethane sulfonic acid while stirring, whereby a catalyst solution was obtained. In other words, 1 mol of trifluoromethane sulfonic acid was added to 1 mol of zinc acetylacetonato monohydrate to prepare a mixed solution.
Aqueous catalyst quencher solution feed rate: 0.16 kg/hr
MFR of the resulting pellet (A-4) was 6.8 g/10 min (210° C., under a load of 2,160 g). In addition, the pellet (A-4) had a content of acetic acid of 420 ppm, a content of zinc ion of 120 ppm, a content of sodium of 130 ppm, a content of the phosphate compound in terms of phosphoric radical equivalent of 20 ppm, a content of trifluoromethane sulfonic acid ion of 280 ppm, and a content of the boron compound in terms of a boron equivalent value of 12 ppm. In addition, the amount of the structural unit (ii) other than the ethylene unit and the vinyl alcohol unit of the EVOH (A-4) introduced (amount of modification of epoxypropane) was, as determined by $^1$H-NMR (internal standard substance: tetramethylsilane; solvent: d6-DMSO) was 5.8 mol %.

Production Example 5

Production of Pellet (A-5)

Into a polymerization tank equipped with a cooling device and a stirrer were charged 20,000 parts by mass of vinyl acetate, 4,000 parts by mass of methanol, 10 parts by mass of acetyl peroxide as a polymerization initiator (500 ppm with respect to the amount of vinyl acetate charged), 0.4 parts by mass of citric acid (20 ppm with respect to the amount of vinyl acetate charged), and 560 parts by mass of 3,4-diacetoxy-1-butene, and replacement with nitrogen was carried out while stirring. Thereafter, ethylene was introduced thereto, followed by adjusting the internal temperature to 67° C. and the ethylene pressure to 35 Kg/cm². Subsequently, polymerization was allowed while gradually adding 3,4-diacetoxy-1-butene in a total amount of 180 parts by mass for 6 hours until the degree of polymerization reached 50% with respect to vinyl acetate charged. Thereafter, sorbic acid (SA) in an amount of 10 parts by mass (500 ppm with respect to the amount of vinyl acetate charged) was dissolved in methanol to prepare a 1.5% by mass solution, which was added to the polymerization tank. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 29.0 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-5) having a saponification degree of 99.5 mol %.

It should be noted that as the structural unit (I) of the EVOH (A-5) other than the ethylene unit and the vinyl alcohol unit, a structural unit (i) represented by the following formula was introduced, and the amount introduced was 2.5 mol % according to the determination by $^1$H-NMR (internal standard substance: tetramethylsilane; solvent: d6-DMSO).

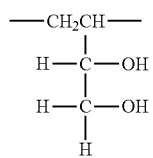

(i)

EVOH (A-5) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.07 g of sodium hydrogenphosphate and 0.32 g of orthoboric acid dissolved in 1 L), at a bath ratio of 20, followed by drying and pelletization with an extruder to give a pellet (A-5). The MFR of the pellet (A-5) was 2.5 g/10 min (210° C., under a load of 2,160 g). In addition, the pellet (A-5) had a content of acetic acid of 150 ppm, a content of sodium of 150 ppm, a content of the phosphate compound in terms of phosphoric radical equivalent of 50 ppm, and a content of the boron compound in terms of a boron equivalent value of 150 ppm.

Production Example 6

Production of Pellet (A-6)

The pellet (A-1) obtained in Production Example 1 in an amount of 90 parts by mass, 10 parts by mass of polyoctenylene obtained in Synthesis Example described above, and 0.4242 parts by mass of cobalt (II) stearate (0.0400 parts by mass in terms of cobalt atom) were dry blended, and extruded using a biaxial extruder "TEM-35BS" (37 mmφ, L/D=52.5) manufactured by Toshiba Machine Co., Ltd. under the extrusion conditions as in the following. After pelletization, drying gave a pellet (A-6) of a composition containing EVOH (A-1), polyoctenylene and cobalt stearate.

Cylinder, die temperature settings:
cylinder part resin feed port/cylinder part/adaptor/die = 160/200/220/220 (° C.)
Screw rotation speed: 200 rpm
Feed rate: 20 kg/hr MFR of the resulting pellet (A-6) was 4.5 g/10 min (210° C., under a load of 2,160 g). In addition, the pellet (A-6) had a content of acetic acid of 105 ppm, a content of sodium ion of 125 ppm, a content of cobalt ion of 400 ppm, a content of the phosphate compound in terms of phosphoric radical equivalent of 40 ppm, and a content of the boron compound in terms of a boron equivalent value of 230 ppm.

Furthermore, a monolayer film having a thickness of 30 μm was obtained from the pellet (A-6) using a film-forming machine including a 40φ extruder ("PLABOR GT-40-A" manufactured by Research Laboratory of Plastics Technology Co., Ltd.) and a T die, under the following extrusion conditions.

Model: single screw extruder (non-bent type)
L/D: 24
Diameter: 40 mmφ
Screw: single-screw full-flight type, with nitriding steel surface
Screw rotation speed: 40 rpm
Die: coat hanger die with a width of 550 mm
Lip gap: 0.3 mm
Cylinder, die temperature settings:
Cylinder part resin feed port/cylinder part/adaptor/die=160/190/200/200 (° C.)
Temperature of cooling roller: 30° C.
Draw speed: 10 m/min Observation of a cross-section of the monolayer film obtained with an electron microscope revealed dispersion of particles of polyoctenylene having a particle size of no greater than 1 μm in a matrix constituted with the EVOH (A-1).

Production Example 7

Production of Pellet (A-7)

The pellet (A-1) obtained in Production Example 1 in an amount of 80 parts by mass and 20 parts by mass of the pellet (A-4) obtained in Production Example 4 were dry blended, and extruded using a biaxial extruder "TEM-35BS" (37 mmφ, L/D=52.5) manufactured by Toshiba Machine Co., Ltd. under the extrusion conditions as in the following. After pelletization, drying gave a pellet (A-7) containing EVOH (A-1) and EVOH (A-4).

Cylinder, die temperature settings:
cylinder part resin feed port/cylinder part/adaptor/die=160/200/220/220 (° C.)
Screw rotation speed: 200 rpm
Feed rate: 20 kg/hr MFR of the resulting pellet (A-7) was 4.3 g/10 min (210° C., under a load of 2,160 g). In addition, the pellet (A-7) had a content of acetic acid of 160 ppm, a content of zinc ion of 20 ppm, a content of sodium of 135 ppm, a content of the phosphate compound in terms of phosphoric radical equivalent of 40 ppm, a content of trifluoromethane sulfonic acid ion of 55 ppm, and a content of the boron compound in terms of a boron equivalent value of 210 ppm Production Example 8

Production of Pellet (A-8)

A pellet (A-8) was obtained in a similar manner to Production Example 2 except that EVOH (A-2) having the content of ethylene units of 44.5 mol % and a saponification degree of 99.5% was treated with an aqueous solution containing acetic acid and phosphoric acid (in 1 of aqueous solution dissolving 0.3 g of acetic acid, 0.06 g of phosphoric acid and 0.03 g of orthoboric acid) at a bath ratio of 20 in Production Example 2. MFR of the pellet (A-8) was 11.6 g/10 min (210° C., under a load of 2,160 g). Furthermore, the pellet (A-8) had a content of acetic acid of 90 ppm, a content of the phosphate compound in terms of phosphoric radical equivalent of 43 ppm, and a content of the boron compound in terms of a boron equivalent of 10 ppm.

Example 2

The pellet (A-1) was supplied to a coextruder in molten states at 210° C. with a 17-layered feed block such that a multilayered structure was formed which included eight layers A and nine layers B alternately with the resin composition that each constitutes the layer A and the layer B, and coextruded to allow for interflowing, whereby a multilayer laminate was produced. The thickness of the channel of each layer was varied so as to gradually increase in the feed block from the front face side toward the middle side, whereby melts of the pellet (A-1) that interflowed was extruded such that the each layer of the extruded multilayered structure has a uniform thickness. In addition, a slit shape was designed so as to give an approximately the same thickness of the layer A and the layer B that are adjacent with each other. The laminate consisting of 17 layers in total thus obtained was maintained to have the surface temperature of 80° C., followed by solidification by rapid cooling on a casting drum which had been electrostatically applied, and then rolled. It should be noted that the channel shape and total amount of discharge were predetermined such that a time period of about 4 min elapsed from the interflow of the melts of the pellet (A-1) until the solidification by rapid cooling on the casting drum.

As a result of observation of a cross section of the cast film obtained as described above with DIGITAL MICROSCOPE VHX-900 (manufactured by KEYENCE Corporation), a multilayered structure having an average thickness of each layer A and layer B being 1 μm, and an average thickness of the entirety being 17 μm was revealed. It is to be noted that each thickness was an average of measurements at randomly selected nine points.

Comparative Example 1

Using a monolayer film extrusion device, the pellet (A-1) was extruded in a molten state so as to form a monolayer film. Then solidification by rapid cooling on a casting drum which had been was maintained to have the surface temperature of 80° C. and electrostatically applied was carried out, and the film was rolled. It should be noted that the channel shape and total amount of discharge were predetermined such that a time period of about 4 min elapsed from the extrusion of the melt of the pellet (A-1) until the solidification by rapid cooling on the casting drum.

As a result of observation of a cross section of the cast film obtained as described above with DIGITAL MICROSCOPE VHX-900 (manufactured by KEYENCE CORPORATION), the average thickness of the entirety being 20 μm was revealed.

Examples 2 to 23, Comparative Example 2, Comparative Example 4, Comparative Example 6, Comparative Example 8, Comparative Example 10, Comparative Example 12

Multilayered structures according to the Examples 2 to 23, and Comparative Examples 2, 4, 6, 8, 10 and 12 were produced in a similar manner to Example 1 except that the pellet type, lamination state, and the type and content of the metal salt as shown in Tables 1 to 6 were employed.

Comparative Example 3, Comparative Example 5, Comparative Example 7, Comparative Example 9, Comparative Example 11

Monolayer films according to Comparative Examples 3, 5, 7, 9 and 11 were produced in a similar manner to Example 1 except that the pellet type, and the type and content of the metal salt as shown in Tables 1 to 6 were employed.

(Method for Evaluation of Characteristics of Multilayered Structure and Monolayer Film)

Each of the characteristics of the multilayered structures and monolayer films obtained in Examples 1 to 23 and Comparative Examples 1 to 12 was evaluated according to the following method. The results of evaluation of these characteristics are shown in Tables 1 to 6 together with the proportion of components, physical properties, and the like in the layer A and the layer B.

(1) Melt Viscosity of Resin Composition Constituting Each Layer

The melt viscosity of the resin composition constituting the layer A and the resin composition constituting the layer B at predetermined temperatures was measured on a melted sample pellet using Capilograph (manufactured by Toyo Seiki Seisaku-sho, Ltd., model IC).

(2) Appearance of Multilayered Structure and Monolayer Film

The presence/absence of uneven flow, streak, and fish eye of the multilayered structures and monolayer films obtained were confirmed by visual inspection. The appearance of the multilayered structures and monolayer films was determined according to the following criteria:

A: uneven flow, streak and fish eye being almost absent;

B: uneven flow, streak and fish eye being present but a little;

C: uneven flow, streak and fish eye being markedly present; and

D: uneven flow and streak being remarkable, with a large number of fish eyes present.

(3) Haze of Multilayered Structure and Monolayer Film

A part of the multilayered structure and monolayer film obtained was cut out, and a silicon oil was coated thereon. Then HR-100 manufactured by Murakami Color Research Laboratory CO., Ltd. was used to measure a haze value according to ASTM D1003-61.

(4) Oxygen Transmission Rate of Multilayered Structure and Monolayer Film

On the assumption that a multilayered structure is used for a packaging material filled with a water-based content, moisture conditioning of two pieces of a sample of the multilayered structure or monolayer film was carried out at 20° C., with 30% RH on one face of one piece, and with a high humidity of 95% RH on one face of another piece for 5 days. The two pieces of the sample of the conditioned multilayered structure or monolayer film were used to measure the oxygen transmission rate using MOCON, model OX-TRAN model 10/50A manufactured by Modern Controls, Inc., under a condition involving 20° C., with 30% RH and 100% RH, respectively, in accordance with a method of JIS-K7126 (isopiestic method), and the average was determined (unit: mL·20 µm/m$^2$·day·atm).

(5) Flex Resistance of Multilayered Structure and Monolayer Film

In accordance with ASTM-F392-74, flexion was repeatedly allowed using "Gelbo-Flex tester" manufactured by Rigaku Kogyo Co., Ltd., and the number of times of the flection repeated until a through-hole (pinhole) was first observed.

(6) Oxygen Transmission Rate after Flexion of Multilayered Structure and Monolayer Film The oxygen transmission rate of the multilayered structure and the monolayer film was determined in accordance with ASTM-F392-74 after repeating flexion 50 times using "Gelbo-Flex tester" manufactured by Rigaku Kogyo Co., Ltd. in a similar manner to that described above, and the average value was determined. It is to be noted that when a through-hole (pinhole) was observed in the multilayered structure or the monolayer film after the flexion, the evaluation result was made as "determination failed".

TABLE 1

| | | | Unit | Example 1 | Example 2 | Example 3 | Example 4 |
|---|---|---|---|---|---|---|---|
| Multilayered structure | Layer A | Resin of layer A | — | EVOH (A-1) | EVOH (A-1) | EVOH (A-1) | EVOH (A-1) |
| | | Pellet type of layer A | — | A-1 | A-1 | A-1 | A-1 |
| | | Content of ethylene units | mol % | 32.5 | 32.5 | 32.5 | 32.5 |
| | | Saponification degree | mol % | 99.5 | 99.5 | 99.5 | 99.5 |
| | | Content of phosphate compound | ppm | 45 | 45 | 45 | 45 |
| | | Content of acetic acid | ppm | 150 | 150 | 150 | 150 |
| | | Content of boron compound | ppm | 260 | 260 | 260 | 260 |
| | | Melt viscosity ($\eta_{1A}$) | Pa · s | 3,100 | 3,100 | 3,100 | 3,100 |
| | | Melt viscosity ($\eta_{2A}$) | Pa · s | 500 | 500 | 500 | 500 |
| | | (1/2) log10 ($\eta_{2A}/\eta_{1A}$) | — | −0.396 | −0.396 | −0.396 | −0.396 |
| | | MFR (210° C., 2,160 g) | g/10 min | 3.8 | 3.8 | 3.8 | 3.8 |
| | | Number of lamination of layer A | — | 9 | 5 | 17 | 33 |
| | | Average thickness of layer A | µm | 1.2 | 2.2 | 0.6 | 0.3 |
| | | Metal species | — | Na | Na | Na | Na |
| | | Metal element equivalent content (Note 1) | ppm | 140 | 140 | 140 | 140 |
| | Layer B | Resin of layer B | — | EVOH (A-1) | EVOH (A-1) | EVOH (A-1) | EVOH (A-1) |
| | | Pellet type of layer B | — | A-1 | A-1 | A-1 | A-1 |
| | | Content of ethylene units | mol % | 32.5 | 32.5 | 32.5 | 32.5 |
| | | Saponification degree | mol % | 99.5 | 99.5 | 99.5 | 99.5 |
| | | Content of phosphate compound | ppm | 45 | 45 | 45 | 45 |
| | | Content of acetate | ppm | 150 | 150 | 150 | 150 |
| | | Content of boron compound | ppm | 260 | 260 | 260 | 260 |
| | | Melt viscosity ($\eta_{1B}$) | Pa · s | 3,100 | 3,100 | 3,100 | 3,100 |
| | | Melt viscosity ($\eta_{2B}$) | Pa · s | 500 | 500 | 500 | 500 |
| | | (1/2) log10 ($\eta_{2B}/\eta_{1B}$) | — | −0.396 | −0.396 | −0.396 | −0.396 |
| | | MFR (210° C., 2,160 g) | g/10 min | 3.8 | 3.8 | 3.8 | 3.8 |
| | | Number of lamination of layer B | — | 8 | 4 | 16 | 32 |
| | | Average thickness of layer B | µm | 1.2 | 2.2 | 0.6 | 0.3 |
| | | Metal species | — | Na | Na | Na | Na |
| | | Metal element equivalent content (Note 2) | ppm | 140 | 140 | 140 | 140 |
| | Entirety | Average thickness of multilayered structure | µm | 20.4 | 19.8 | 19.8 | 19.5 |
| | | Average thickness of single resin layer | µm | 1.2 | 2.2 | 0.6 | 0.3 |
| | | $\eta_{2B}/\eta_{2A}$ | — | 1.00 | 1.00 | 1.00 | 1.00 |
| Evaluation of characteristics | | Appearance | — | A | A | A | A |
| | | Haze | % | 0.9 | 1.4 | 0.8 | 0.6 |
| | | Oxygen transmission rate | (Note 3) | 0.21 | 0.33 | 0.2 | 0.17 |
| | | Flex resistance | time | 130 | 80 | 170 | 210 |
| | | Oxygen transmission rate after flexion | (Note 3) | 2.6 | 5.2 | 1.5 | 1.1 |

| | | | Example 5 | Example 6 | Comparative Example 1 | Comparative Example 2 |
|---|---|---|---|---|---|---|
| Multilayered structure | Layer A | Resin of layer A | EVOH (A-1) | EVOH (A-1) | EVOH (A-1) | EVOH (A-1) |
| | | Pellet type of layer A | A-1 | A-1 | A-1 | A-1 |
| | | Content of ethylene units | 32.5 | 32.5 | 32.5 | 32.5 |
| | | Saponification degree | 99.5 | 99.5 | 99.5 | 99.5 |
| | | Content of phosphate compound | 45 | 45 | 45 | 45 |
| | | Content of acetic acid | 150 | 150 | 150 | 150 |
| | | Content of boron compound | 260 | 260 | 260 | 260 |

TABLE 1-continued

|  |  |  |  |  |  |  |
|---|---|---|---|---|---|---|
|  | Melt viscosity ($\eta_{1A}$) | 3,100 | 3,100 | 3,100 | 3,100 |
|  | Melt viscosity ($\eta_{2A}$) | 500 | 500 | 500 | 500 |
|  | (1/2) log10 ($\eta_{2A}/\eta_{1A}$) | −0.396 | −0.396 | −0.396 | −0.396 |
|  | MFR (210° C., 2,160 g) | 3.8 | 3.8 | 3.8 | 3.8 |
|  | Number of lamination of layer A | 9 | 17 | 1 | 2 |
|  | Average thickness of layer A | 0.2 | 0.2 | 20.0 | 6.6 |
|  | Metal species | Na | Na | Na | Na |
|  | Metal element equivalent content (Note 1) | 140 | 140 | 140 | 140 |
| Layer B | Resin of layer B | EVOH (A-1) | EVOH (A-1) | — | EVOH (A-1) |
|  | Pellet type of layer B | A-1 | A-1 | — | A-1 |
|  | Content of ethylene units | 32.5 | 32.5 | — | 32.5 |
|  | Saponification degree | 99.5 | 99.5 | — | 99.5 |
|  | Content of phosphate compound | 45 | 45 | — | 45 |
|  | Content of acetate | 150 | 150 | — | 150 |
|  | Content of boron compound | 260 | 260 | — | 260 |
|  | Melt viscosity ($\eta_{1B}$) | 3,100 | 3,100 | — | 3,100 |
|  | Melt viscosity ($\eta_{2B}$) | 500 | 500 | — | 500 |
|  | (1/2) log10 ($\eta_{2B}/\eta_{1B}$) | −0.396 | −0.396 | — | −0.396 |
|  | MFR (210° C., 2,160 g) | 3.8 | 3.8 | — | 3.8 |
|  | Number of lamination of layer B | 8 | 16 | — | 1 |
|  | Average thickness of layer B | 0.2 | 0.2 | — | 6.6 |
|  | Metal species | Na | Na | — | Na |
|  | Metal element equivalent content (Note 2) | 140 | 140 | — | 140 |
| Entirety | Average thickness of multilayered structure | 3.4 | 6.6 | 20.0 | 19.8 |
|  | Average thickness of single resin layer | 0.2 | 0.2 | 20.0 | 6.6 |
|  | $\eta_{2B}/\eta_{2A}$ | 1.00 | 1.00 | — | 1.00 |
| Evaluation of characteristics | Appearance | A | A | A | A |
|  | Haze | 0.3 | 0.3 | 2.3 | 2.1 |
|  | Oxygen transmission rate | 0.23 | 0.21 | 0.47 | 0.45 |
|  | Flex resistance | 450 | 330 | 35 | 40 |
|  | Oxygen transmission rate after flexion | 2.2 | 3.5 | determination failed | 440 |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.
Note 3:
mL · 20 um/m² · day · atm

TABLE 2

|  |  |  | Unit | Example 7 | Example 8 | Example 9 | Example 10 | Example 11 |
|---|---|---|---|---|---|---|---|---|
| Multilayered structure | Layer A | Resin of layer A | — | EVOH (A-2) | EVOH (A-2) | EVOH (A-2) | EVOH (A-2) | EVOH (A-2) |
|  |  | Pellet type of layer A | — | A-2 | A-2 | A-2 | A-2 | A-2 |
|  |  | Content of ethylene units | mol % | 44.5 | 44.5 | 44.5 | 44.5 | 44.5 |
|  |  | Saponification degree | mol % | 99.5 | 99.5 | 99.5 | 99.5 | 99.5 |
|  |  | Content of phosphate compound | ppm | 40 | 40 | 40 | 40 | 40 |
|  |  | Content of acetic acid | ppm | 135 | 135 | 135 | 135 | 135 |
|  |  | Content of boron compound | ppm | 10 | 10 | 10 | 10 | 10 |
|  |  | Melt viscosity ($\eta_{1A}$) | Pa · s | 1,300 | 1,300 | 1,300 | 1,300 | 1,300 |
|  |  | Melt viscosity ($\eta_{2A}$) | Pa · s | 300 | 300 | 300 | 300 | 300 |
|  |  | (1/2) log10 ($\eta_{2A}/\eta_{1A}$) | — | −0.318 | −0.318 | −0.318 | −0.318 | −0.318 |
|  |  | MFR (210° C., 2,160 g) | g/10 min | 11.5 | 11.5 | 11.5 | 11.5 | 11.5 |
|  |  | Number of lamination of layer A | — | 9 | 5 | 17 | 33 | 17 |
|  |  | Average thickness of layer A | μm | 1.2 | 2.2 | 0.6 | 0.3 | 0.6 |
|  |  | Metal species | — | Na | Na | Na | Na | Na |
|  |  | Metal element equivalent content (Note 1) | ppm | 140 | 140 | 140 | 140 | 140 |
|  | Layer B | Resin of layer B | — | EVOH (A-1) | EVOH (A-1) | EVOH (A-1) | EVOH (A-1) | EVOH (A-2) |
|  |  | Pellet type of layer B | — | A-1 | A-1 | A-1 | A-1 | A-2 |
|  |  | Content of ethylene units | mol % | 32.5 | 32.5 | 32.5 | 32.5 | 44.5 |
|  |  | Saponification degree | mol % | 99.5 | 99.5 | 99.5 | 99.5 | 99.5 |
|  |  | Content of phosphate compound | ppm | 45 | 45 | 45 | 45 | 40 |
|  |  | Content of acetate | ppm | 150 | 150 | 150 | 150 | 135 |
|  |  | Content of boron compound | ppm | 260 | 260 | 260 | 260 | 140 |
|  |  | Melt viscosity ($\eta_{1B}$) | Pa · s | 3,100 | 3,100 | 3,100 | 3,100 | 1,300 |
|  |  | Melt viscosity ($\eta_{2B}$) | Pa · s | 500 | 500 | 500 | 500 | 300 |
|  |  | (1/2) log10 ($\eta_{2B}/\eta_{1B}$) | — | −0.396 | −0.396 | −0.396 | −0.396 | −0.318 |
|  |  | MFR (210° C., 2,160 g) | g/10 min | 3.8 | 3.8 | 3.8 | 3.8 | 11.5 |
|  |  | Number of lamination of layer B | — | 8 | 4 | 16 | 32 | 16 |
|  |  | Average thickness of layer B | μm | 1.2 | 2.2 | 0.6 | 0.3 | 0.6 |

TABLE 2-continued

|  |  |  | | | | | | |
|---|---|---|---|---|---|---|---|---|
| | | Metal species | — | Na | Na | Na | Na | Na |
| | | Metal element equivalent content (Note 2) | ppm | 140 | 140 | 140 | 140 | 140 |
| | Entirety | Average thickness of multilayered structure | μm | 20.4 | 19.8 | 19.8 | 19.5 | 19.8 |
| | | Average thickness of single resin layer | μm | 1.2 | 2.2 | 0.6 | 0.3 | 0.6 |
| | | $\eta_{2B}/\eta_{2A}$ | — | 1.67 | 1.67 | 1.67 | 1.67 | 1.00 |
| Evaluation of characteristics | | Appearance | — | A | A | A | A | A |
| | | Haze | % | 1.1 | 1.9 | 0.9 | 0.7 | 1.5 |
| | | Oxygen transmission rate | (Note 3) | 0.25 | 0.47 | 0.23 | 0.18 | 0.48 |
| | | Flex resistance | time | 220 | 170 | 280 | 310 | 400 |
| | | Oxygen transmission rate after flexion | (Note 3) | 1.00 | 3.31 | 0.79 | 0.54 | 1.44 |

|  |  |  | Example 12 | Example 13 | Comparative Example 3 | Comparative Example 4 |
|---|---|---|---|---|---|---|
| Multilayered structure | Layer A | Resin of layer A | EVOH (A-2) | EVOH (A-2) | EVOH (A-2) | EVOH (A-2) |
| | | Pellet type of layer A | A-2 | A-2 | A-2 | A-2 |
| | | Content of ethylene units | 44.5 | 44.5 | 44.5 | 44.5 |
| | | Saponification degree | 99.5 | 99.5 | 99.5 | 99.5 |
| | | Content of phosphate compound | 40 | 40 | 40 | 40 |
| | | Content of acetic acid | 135 | 135 | 135 | 135 |
| | | Content of boron compound | 10 | 10 | 10 | 10 |
| | | Melt viscosity ($\eta_{1A}$) | 1,300 | 1,300 | 1,300 | 1,300 |
| | | Melt viscosity ($\eta_{2A}$) | 300 | 300 | 300 | 300 |
| | | $(1/2) \log_{10} (\eta_{2A}/\eta_{1A})$ | −0.318 | −0.318 | −0.318 | −0.318 |
| | | MFR (210° C., 2,160 g) | 11.5 | 11.5 | 11.5 | 11.5 |
| | | Number of lamination of layer A | 9 | 17 | 1 | 2 |
| | | Average thickness of layer A | 0.2 | 0.2 | 20.0 | 6.6 |
| | | Metal species | Na | Na | Na | Na |
| | | Metal element equivalent content (Note 1) | 140 | 140 | 140 | 140 |
| | Layer B | Resin of layer B | EVOH (A-2) | EVOH (A-2) | — | EVOH (A-1) |
| | | Pellet type of layer B | A-1 | A-1 | — | A-1 |
| | | Content of ethylene units | 32.5 | 32.5 | — | 32.5 |
| | | Saponification degree | 99.5 | 99.5 | — | 99.5 |
| | | Content of phosphate compound | 45 | 45 | — | 45 |
| | | Content of acetate | 150 | 150 | — | 150 |
| | | Content of boron compound | 260 | 260 | — | 260 |
| | | Melt viscosity ($\eta_{1B}$) | 3,100 | 3,100 | — | 3,100 |
| | | Melt viscosity ($\eta_{2B}$) | 500 | 500 | — | 500 |
| | | $(1/2) \log_{10} (\eta_{2B}/\eta_{1B})$ | −0.396 | −0.396 | — | −0.396 |
| | | MFR (210° C., 2,160 g) | 3.8 | 3.8 | — | 3.8 |
| | | Number of lamination of layer B | 32 | 32 | — | 1 |
| | | Average thickness of layer B | 0.2 | 0.2 | — | 6.6 |
| | | Metal species | Na | Na | — | Na |
| | | Metal element equivalent content (Note 2) | 140 | 140 | — | 140 |
| | Entirety | Average thickness of multilayered structure | 8.2 | 9.8 | 20.0 | 19.8 |
| | | Average thickness of single resin layer | 0.2 | 0.2 | 20.0 | 6.6 |
| | | $\eta_{2B}/\eta_{2A}$ | 1.67 | 1.67 | — | 1.67 |
| Evaluation of characteristics | | Appearance | A | A | A | A |
| | | Haze | 0.5 | 0.4 | 2.6 | 2.4 |
| | | Oxygen transmission rate | 0.46 | 0.43 | 1.87 | 1.02 |
| | | Flex resistance | 400 | 400 | 60 | 50 |
| | | Oxygen transmission rate after flexion | 1.38 | 1.29 | 18.3 | 76.7 |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.
Note 3:
$mL \cdot 20 \, \mu m/m^2 \cdot day \cdot atm$

TABLE 3

|  |  |  | Unit | Example 14 | Example 15 | Comparative Example 5 | Comparative Example 6 |
|---|---|---|---|---|---|---|---|
| Multilayered structure | Layer A | Resin of layer A | — | EVOH (A-1) | EVOH (A-3) | EVOH (A-3) | EVOH (A-1) |
| | | Pellet type of layer A | — | A-1 | A-3 | A-3 | A-1 |
| | | Content of ethylene units | mol % | 32.5 | 26.5 | 26.5 | 32.5 |

TABLE 3-continued

|  |  | Unit | Example 14 | Example 15 | Comparative Example 5 | Comparative Example 6 |
|---|---|---|---|---|---|---|
|  | Saponification degree | mol % | 99.5 | 99.8 | 99.8 | 99.5 |
|  | Content of phosphate compound | ppm | 45 | 5 | 5 | 45 |
|  | Content of acetic acid | ppm | 150 | 95 | 95 | 150 |
|  | Content of boron compound | ppm | 260 | 85 | 85 | 260 |
|  | Melt viscosity ($\eta_{1A}$) | Pa · s | 3,100 | 2,000 | 2,000 | 3,100 |
|  | Melt viscosity ($\eta_{2A}$) | Pa · s | 500 | 390 | 390 | 500 |
|  | (1/2) log10 ($\eta_{2A}/\eta_{1A}$) | — | −0.396 | −0.355 | −0.355 | −0.396 |
|  | MFR (210° C., 2,160 g) | g/10 min | 3.8 | 6.4 | 6.4 | 3.8 |
|  | Number of lamination of layer A | — | 17 | 17 | 1 | 2 |
|  | Average thickness of layer A | μm | 0.6 | 0.6 | 20.0 | 6.6 |
|  | Metal species | — | Na | Na | Na | Na |
|  | Metal element equivalent content (Note 1) | ppm | 140 | 14 | 14 | 140 |
| Layer B | Resin of layer B | — | EVOH (A-3) | EVOH (A-3) | — | EVOH (A-3) |
|  | Pellet type of layer B | — | A-3 | A-3 | — | A-3 |
|  | Content of ethylene units | mol % | 26.5 | 26.5 | — | 26.5 |
|  | Saponification degree | mol % | 99.8 | 99.8 | — | 99.8 |
|  | Content of phosphate compound | ppm | 5 | 5 | — | 5 |
|  | Content of acetate | ppm | 95 | 95 | — | 95 |
|  | Content of boron compound | ppm | 85 | 85 | — | 85 |
|  | Melt viscosity ($\eta_{1B}$) | Pa · s | 2,000 | 2,000 | — | 2,000 |
|  | Melt viscosity ($\eta_{2B}$) | Pa · s | 390 | 390 | — | 390 |
|  | (1/2) log10 ($\eta_{2B}/\eta_{1B}$) | — | −0.355 | −0.355 | — | −0.355 |
|  | MFR (210° C., 2,160 g) | g/10 min | 6.4 | 6.4 | — | 6.4 |
|  | Number of lamination of layer B | — | 16 | 16 | — | 1 |
|  | Average thickness of layer B | μm | 0.6 | 0.6 | — | 6.6 |
|  | Metal species | — | Na | Na | — | Na |
|  | Metal element equivalent content (Note 2) | ppm | 14 | 14 | — | 14 |
| Entirety | Average thickness of multilayered structure | μm | 19.8 | 19.8 | 20.0 | 19.8 |
|  | Average thickness of single resin layer | μm | 0.6 | 0.6 | 20.0 | 6.6 |
|  | $\eta_{2B}/\eta_{2A}$ | — | 0.78 | 1.00 | — | 0.78 |
| Evaluation of characteristics | Appearance | — | A | A | A | A |
|  | Haze | % | 0.7 | 0.6 | 2.2 | 2.1 |
|  | Oxygen transmission rate | (Note 3) | 0.12 | 0.1 | 0.37 | 0.47 |
|  | Flex resistance | time | 150 | 120 | 25 | 35 |
|  | Oxygen transmission rate after flexion | (Note 3) | 1.3 | 2.5 | determination failed | determination failed |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.
Note 3:
mL · 20 μm/m² · day · atm

TABLE 4

|  |  |  | Unit | Example 16 | Example 17 | Example 18 | Comparative Example 7 | Comparative Example 8 |
|---|---|---|---|---|---|---|---|---|
| Multilayered structure | Layer A | Resin of layer A | — | EVOH (A-4) | EVOH (A-4) | EVOH (A-4) | EVOH (A-4) | EVOH (A-4) |
|  |  | Pellet type of layer A | — | A-4 | A-4 | A-4 | A-4 | A-4 |
|  |  | Content of ethylene units | mol % | 44.5 | 44.5 | 44.5 | 44.5 | 44.5 |
|  |  | Saponification degree | mol % | 99.5 | 99.5 | 99.5 | 99.5 | 99.5 |
|  |  | Content of structural unit (II) | mol % | 5.8 | 5.8 | 5.8 | 5.8 | 5.8 |
|  |  | Content of phosphate compound | ppm | 20 | 20 | 20 | 20 | 20 |
|  |  | Content of acetic acid | ppm | 420 | 420 | 420 | 420 | 420 |
|  |  | Content of boron compound | ppm | 12 | 12 | 12 | 12 | 12 |
|  |  | Melt viscosity ($\eta_{1A}$) | Pa · s | 2,000 | 2,000 | 2,000 | 2,000 | 2,000 |
|  |  | Melt viscosity ($\eta_{2A}$) | Pa · s | 390 | 390 | 390 | 390 | 390 |
|  |  | (1/2) log10 ($\eta_{2A}/\eta_{1A}$) | — | −0.355 | −0.355 | −0.355 | −0.355 | −0.355 |
|  |  | MFR (210° C., 2,160 g) | g/10 min | 6.8 | 6.8 | 6.8 | 6.8 | 6.8 |
|  |  | Number of lamination of layer A | — | 9 | 17 | 17 | 1 | 2 |
|  |  | Average thickness of layer A | μm | 1.2 | 0.6 | 0.6 | 20.0 | 6.6 |
|  |  | Metal species | — | Na, Zn | Na, Zn | Na, Zn | Na, Zn | Na, Zn |
|  |  | Metal element equivalent content (Note 1) | ppm | 130, 120 | 130, 120 | 130, 120 | 130, 120 | 130, 120 |
|  | Layer B | Resin of layer B | — | EVOH (A-1) | EVOH (A-1) | EVOH (A-4) | — | EVOH (A-1) |
|  |  | Pellet type of layer B | — | A-1 | A-1 | A-4 | — | A-1 |

TABLE 4-continued

|  |  | Unit | Example 16 | Example 17 | Example 18 | Comparative Example 7 | Comparative Example 8 |
|---|---|---|---|---|---|---|---|
|  | Content of ethylene units | mol % | 32.5 | 32.5 | 44.5 | — | 32.5 |
|  | Saponification degree | mol % | 99.5 | 99.5 | 99.5 | — | 99.5 |
|  | Content of structural unit (II) | mol % | — | — | 5.8 | — | — |
|  | Content of phosphate compound | ppm | 45 | 45 | 20 | — | 45 |
|  | Content of acetate | ppm | 150 | 150 | 420 | — | 150 |
|  | Content of boron compound | ppm | 260 | 260 | 12 | — | 260 |
|  | Melt viscosity ($\eta_{1B}$) | Pa·s | 3,100 | 3,100 | 2,000 | — | 3,100 |
|  | Melt viscosity ($\eta_{2B}$) | Pa·s | 500 | 500 | 390 | — | 500 |
|  | (1/2) log10 ($\eta_{2B}/\eta_{1B}$) | — | −0.396 | −0.396 | −0.355 | — | −0.396 |
|  | MFR (210° C., 2,160 g) | g/10 min | 3.8 | 3.8 | 6.8 | — | 3.8 |
|  | Number of lamination of layer B | — | 8 | 16 | 16 | — | 1 |
|  | Average thickness of layer B | μm | 1.2 | 0.6 | 0.6 | — | 6.6 |
|  | Metal species | — | Na | Na | Na, Zn | — | Na |
|  | Metal element equivalent content (Note 2) | ppm | 140 | 140 | 130, 120 | — | 140 |
| Entirety | Average thickness of multilayered structure | μm | 20.4 | 19.8 | 19.8 | 20.0 | 19.8 |
|  | Average thickness of single resin layer | μm | 2.2 | 1.2 | 1.2 | 20.0 | 2.6 |
|  | $\eta_{2B}/\eta_{2A}$ | — | 1.28 | 1.28 | 1.00 | — | 1.28 |
| Evaluation of characteristics | Appearance | — | A | A | A | A | A |
|  | Haze | % | 0.8 | 0.7 | 0.5 | 1.2 | 1.8 |
|  | Oxygen transmission rate | (Note 3) | 0.32 | 0.28 | 3.2 | 13.2 | 1.5 |
|  | Flex resistance | time | 330 | 410 | 530 | 390 | 65 |
|  | Oxygen transmission rate after flexion | (Note 3) | 0.89 | 0.62 | 5.44 | 27.7 | 49.5 |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.
Note 3:
mL · 20 μm/m² · day · atm

TABLE 5

|  |  |  | Unit | Example 19 | Example 20 | Example 21 | Comparative Example 9 | Comparative Example 10 |
|---|---|---|---|---|---|---|---|---|
| Multilayered structure | Layer A | Resin of layer A | — | EVOH (A-5) | EVOH (A-5) | EVOH (A-5) | EVOH (A-5) | EVOH (A-5) |
|  |  | Pellet type of layer A | — | A-5 | A-5 | A-5 | A-5 | A-5 |
|  |  | Content of ethylene units | mol % | 29 | 29 | 29 | 29 | 29 |
|  |  | Saponification degree | mol % | 99.5 | 99.5 | 99.5 | 99.5 | 99.5 |
|  |  | Content of structural unit (I) | mol % | 2.5 | 2.5 | 2.5 | 2.5 | 2.5 |
|  |  | Content of phosphate compound | ppm | 50 | 50 | 50 | 50 | 50 |
|  |  | Content of acetic acid | ppm | 150 | 150 | 150 | 150 | 150 |
|  |  | Content of boron compound | ppm | 150 | 150 | 150 | 150 | 150 |
|  |  | Melt viscosity ($\eta_{1A}$) | Pa·s | 6,800 | 6,800 | 6,800 | 6,800 | 6,800 |
|  |  | Melt viscosity ($\eta_{2A}$) | Pa·s | 670 | 670 | 670 | 670 | 670 |
|  |  | (1/2) log10 ($\eta_{2A}/\eta_{1A}$) | — | −0.503 | −0.503 | −0.503 | −0.503 | −0.503 |
|  |  | MFR (210° C., 2,160 g) | g/10 min | 2.5 | 2.5 | 2.5 | 2.5 | 2.5 |
|  |  | Number of lamination of layer A | — | 9 | 17 | 17 | 1 | 2 |
|  |  | Average thickness of layer A | μm | 1.2 | 0.6 | 0.6 | 20.0 | 6.6 |
|  |  | Metal species | — | Na | Na | Na | Na | Na |
|  |  | Metal element equivalent content (Note 1) | ppm | 150 | 150 | 150 | 150 | 150 |
|  | Layer B | Resin of layer B | — | EVOH (A-1) | EVOH (A-1) | EVOH (A-5) | — | EVOH (A-1) |
|  |  | Pellet type of layer B | — | A-1 | A-1 | A-5 | — | A-1 |
|  |  | Content of ethylene units | mol % | 32.5 | 32.5 | 29 | — | 32.5 |
|  |  | Saponification degree | mol % | 99.5 | 99.5 | 99.5 | — | 99.5 |
|  |  | Content of structural unit (I) | mol % | — | — | 2.5 | — | — |
|  |  | Content of phosphate compound | ppm | 45 | 45 | 50 | — | 45 |
|  |  | Content of acetate | ppm | 150 | 150 | 150 | — | 150 |
|  |  | Content of boron compound | ppm | 260 | 260 | 150 | — | 260 |
|  |  | Melt viscosity ($\eta_{1B}$) | Pa·s | 3,100 | 3,100 | 6,800 | — | 3,100 |
|  |  | Melt viscosity ($\eta_{2B}$) | Pa·s | 500 | 500 | 670 | — | 500 |
|  |  | (1/2) log10 ($\eta_{2B}/\eta_{1B}$) | — | −0.396 | −0.396 | −0.503 | — | −0.396 |
|  |  | MFR (210° C., 2,160 g) | g/10 min | 3.8 | 3.8 | 2.5 | — | 3.8 |
|  |  | Number of lamination of layer B | — | 8 | 16 | 16 | — | 1 |
|  |  | Average thickness of layer B | μm | 1.2 | 0.6 | 0.6 | — | 6.6 |
|  |  | Metal species | — | Na | Na | Na | — | Na |
|  |  | Metal element equivalent content (Note 2) | ppm | 140 | 140 | 150 | — | 140 |

TABLE 5-continued

|  |  | Unit | Example 19 | Example 20 | Example 21 | Comparative Example 9 | Comparative Example 10 |
|---|---|---|---|---|---|---|---|
| Entirety | Average thickness of multilayered structure | μm | 20.4 | 19.8 | 19.8 | 20.0 | 19.8 |
|  | Average thickness of single resin layer | μm | 2.2 | 1.2 | 1.2 | 20.0 | 2.6 |
|  | $\eta_{2B}/\eta_{2A}$ | — | 0.75 | 0.75 | 1.00 | — | 0.75 |
| Evaluation of characteristics | Appearance | — | A | A | A | A | A |
|  | Haze | % | 1.0 | 0.8 | 0.7 | 1.8 | 2.2 |
|  | Oxygen transmission rate | (Note 3) | 0.17 | 0.15 | 0.30 | 0.7 | 0.58 |
|  | Flex resistance | time | 230 | 290 | 410 | 90 | 55 |
|  | Oxygen transmission rate after flexion | (Note 3) | 0.58 | 0.42 | 0.71 | 4.1 | 38.0 |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.

Note 3:

mL · 20 μm/m² · day · atm

TABLE 6

|  |  |  | Unit | Example 22 | Example 23 | Comparative Example 11 | Comparative Example 12 |
|---|---|---|---|---|---|---|---|
| Multilayered structure | Layer A | Resin of layer A | — | EVOH (A-1)/(A-4) | EVOH (A-1) | EVOH (A-1) | EVOH (A-1)/(A-4) |
|  |  | Pellet type of layer A | — | A-7 | A-6 | A-6 | A-7 |
|  |  | Content of ethylene units (Note 4) | mol % | 35 | 32.5 | 32.5 | 35 |
|  |  | Saponification degree (Note 5) | mol % | 99.5 | 99.5 | 99.5 | 99.5 |
|  |  | Content of polyoctenylene | % by mass | — | 10 | 10 | — |
|  |  | Content of phosphate compound | ppm | 40 | 40 | 40 | 40 |
|  |  | Content of acetic acid | ppm | 160 | 105 | 105 | 160 |
|  |  | Content of boron compound | ppm | 210 | 230 | 230 | 210 |
|  |  | Melt viscosity ($\eta_{1A}$) | Pa · s | 3,000 | 2,900 | 2,900 | 3,000 |
|  |  | Melt viscosity ($\eta_{2A}$) | Pa · s | 490 | 470 | 470 | 490 |
|  |  | (1/2) log10 ($\eta_{2A}/\eta_{1A}$) | — | −0.393 | −0.395 | −0.395 | −0.393 |
|  |  | MFR (210° C., 2,160 g) | g/10 min | 4.3 | 4.5 | 4.5 | 4.3 |
|  |  | Number of lamination of layer A | — | 9 | 17 | 1 | 2 |
|  |  | Average thickness of layer A | μm | 1.2 | 0.6 | 20.0 | 6.6 |
|  |  | Metal species | — | Na, Zn | Na, Co | Na, Co | Na, Zn |
|  |  | Metal element equivalent content (Note 1) | ppm | 135, 20 | 125, 400 | 125, 400 | 135, 20 |
|  | Layer B | Resin of layer B | — | EVOH (A-1) | EVOH (A-1) | — | EVOH (A-1) |
|  |  | Pellet type of layer B | — | A-6 | A-6 | — | A-6 |
|  |  | Content of ethylene units | mol % | 32.5 | 32.5 | — | 32.5 |
|  |  | Saponification degree | mol % | 99.5 | 99.5 | — | 99.5 |
|  |  | Content of polyoctenylene | % by mass | 10 | 10 | — | 10 |
|  |  | Content of phosphate compound | ppm | 40 | 40 | — | 40 |
|  |  | Content of acetate | ppm | 105 | 105 | — | 105 |
|  |  | Content of boron compound | ppm | 230 | 230 | — | 230 |
|  |  | Melt viscosity ($\eta_{1B}$) | Pa · s | 2,900 | 2,900 | — | 2,900 |
|  |  | Melt viscosity ($\eta_{2B}$) | Pa · s | 470 | 470 | — | 470 |
|  |  | (1/2) log10 ($\eta_{2B}/\eta_{1B}$) | — | −0.395 | −0.395 | — | −0.395 |
|  |  | MFR (210° C., 2,160 g) | g/10 min | 4.5 | 4.5 | — | 4.5 |
|  |  | Number of lamination of layer B | — | 8 | 16 | — | 1 |
|  |  | Average thickness of layer B | μm | 1.2 | 0.6 | — | 6.6 |
|  |  | Metal species | — | Na, Co | Na, Co | — | Na, Co |
|  |  | Metal element equivalent content (Note 2) | ppm | 125, 400 | 125, 400 | — | 125, 400 |
| Entirety |  | Average thickness of multilayered structure | μm | 20.4 | 19.8 | 20.0 | 19.8 |
|  |  | Average thickness of single resin layer | μm | 2.2 | 0.6 | 20.0 | 2.2 |
|  |  | $\eta_{2B}/\eta_{2A}$ | — | 0.96 | 1.00 | — | 0.96 |
| Evaluation of characteristics | Appearance |  | — | A | A | A | A |
|  | Haze |  | % | 2.8 | 4.9 | 13.5 | 6.7 |
|  | Oxygen transmission rate |  | (Note 3) | 0.00 | 0.00 | 0.00 | 0.00 |
|  | Flex resistance |  | time | 270 | 180 | 40 | 55 |

TABLE 6-continued

|  | Unit | Example 22 | Example 23 | Comparative Example 11 | Comparative Example 12 |
| --- | --- | --- | --- | --- | --- |
| Oxygen transmission rate after flexion | (Note 3) | 0.00 | 0.00 | 120 | 58 |

Notes 1 and 2:
The "metal element equivalent content" as referred to herein means proportion by mass of the metal element included in the metal salt contained in the resin composition of each layer of the layer A or the layer B, with respect to the mass of the resin composition of each layer.

Note 3:
mL · 20 μm/m² · day · atm

Notes 4 and 5:
The "Content of ethylene units" and "Saponification degree" of EVOH (A-7) as referred to herein mean average values of EVOH (A-1) and EVOH (A-4) contained.

Example 24

A laminate (polypropylene/adhesive resin/ethylene-vinyl alcohol copolymer layer (multilayered structure constituted with alternate 33 layers of EVOH (A-2) and EVOH (A-1))/adhesive resin/polypropylene) in which a multilayered structure and a thermoplastic resin layer were laminated was produced using the following four types of 37-layer coextrusion apparatuses, under the conditions described below. The construction of the sheet included 100 μm of an ethylene-vinyl alcohol copolymer layer (a multilayered structure having 33 layers with an alternate constitution of EVOH (A-2) and EVOH (A-1)), 50 μm of an adhesive resin layer, and 800 μm of a polypropylene layer. It is to be noted that as the ethylene-vinyl alcohol copolymer layer having 33 layers with an alternate constitution, the pellet (A-2) and the pellet (A-1) were supplied to a coextruder in molten states at 220° C. with a 33-layered feed block such that a multilayered structure is formed which includes 17 layers A and 16 layers B alternately with the resin composition that constitutes each pellet, and coextruded to allow for interflowing, whereby a multilayer laminate was produced. The thickness of each layer was varied so as to gradually increase in the feed block from the front face side toward the middle side, whereby melts of the pellet (A-2) and the pellet (A-1) that interflowed were extruded such that the each layer of the extruded multilayered structure has a uniform thickness. In addition, a slit shape was designed so as to give an approximately the same thickness of the layer A and the layer B that are adjacent with each other. The laminate was produced to have a configuration in which the outermost layer of the ethylene-vinyl alcohol copolymer layer that includes 33 layers with an alternate construction was constituted with EVOH (A-2) consisting of the pellet (A-2).

Conditions for coextrusion forming were as follows.

Layered structure: polypropylene/adhesive resin/ethylene-vinyl alcohol copolymer layer (the multilayered structure having 33 layers with an alternate constitution of EVOH (A-2) and EVOH (A-1))/adhesive resin/polypropylene Extrusion temperature of the ethylene-vinyl alcohol copolymer (pellet (A-2) and pellet (A-1)): cylinder part resin feed port/cylinder upstream portion/cylinder middle portion/cylinder downstream portion=175/210/220/220° C.

Extrusion temperature of adhesive resin: cylinder part resin feed port/cylinder upstream portion/cylinder middle portion/cylinder downstream portion=170/170/220/220° C.

Extrusion temperature of polypropylene: cylinder part resin feed port/cylinder upstream portion/cylinder middle portion/cylinder downstream portion=170/170/230/230° C.

Temperature of adaptor: 230° C.
Temperature of feed block: 230° C.
Temperature of die: 235° C.

Specifications of extruder and T die of each resin
Ethylene-vinyl alcohol copolymer (two):
40 φ extruder model VSVE-40-24 (manufactured by Osaka Seiki Kosaku K. K.)
Adhesive resin:
40 φ extruder model 10VSE-40-22 (manufactured by Osaka Seiki Kosaku K. K.)
Polypropylene:
65 φ extruder model 20VS-65-22 (manufactured by Osaka Seiki Kosaku K. K.)
T die:
650 mm width (manufactured by Research Laboratory of Plastics Technology Co., Ltd.)
Temperature of cooling roller: 30° C.
Draw speed: 2 m/min As the polypropylene resin, a mixture of Novatec PP EA7A and Novatec PP EG-7FT (manufactured by Japan Polypropylene Corp.) at a mass ratio of 85:15 was used, and as the adhesive resin, "ADMER QF551", manufactured by Mitsui Chemicals, Inc. was used.

Moisture conditioning of the laminate produced as described above was carried out in an atmosphere involving 23° C. and 50% RH for 30 days, followed by cutting to give a strip section having a width of 15 mm. Measurement of the interlayer adhesive strength between the adhesive resin layer and the layer A was 2,850 g/15 mm, indicating favorable adhesiveness. On the strip section as a measurement sample, T-die peel strength was measured in an atmosphere involving 23° C. and 50% RH, using an autograph "model AGS-H" manufactured by Shimadzu Corporation at a tension rate of 250 mm/min. Thus obtained value (unit: g/15 mm) was determined as the interlayer adhesive strength between the adhesive resin layer and the layer A.

The laminate produced as described above was mounted on a pantograph type biaxial stretching machine manufactured by TOYO SEIKI Co., Ltd., and simultaneous biaxial stretching was carried out at 140° C. with a draw ratio of 3×3 times to obtain a multilayered stretching film. The multilayered sheet exhibited favorable stretchability, and after the stretching, the resulting multilayered stretching film had no crack, lack in uniformity and uneven wall thickness, accompanied by favorable appearance (in terms of the transparency, gel or degraded materials).

Moisture conditioning of the multilayered stretching film produced as described above was carried out at 20° C. and at 30% RH for one face, and at 95% RH with higher humidity for another face for 5 days. Two pieces of a sample of the conditioned multilayered structure were provided to measure the oxygen transmission rate using MOCON, model OX-TRAN10/50A manufactured by Modern Controls, Inc., under a condition involving 20° C., and 30% RH and 100% RH respectively, in accordance with a method of JIS-K7126 (isopiestic method), and the average was determined. The amount of oxygen permeabilization of the multilayered stretching film of the present Example was 0.34 cc/m²·day·atm, indicating a favorable gas barrier property.

Moreover, the laminate obtained as described above was subjected to thermoforming with a thermoforming machine (a vacuum-pressure deep drawing forming machine model "FX-0431-3" manufactured by Asano Laboratories Co. Ltd.) into a shape of a cup (die shape: upper part: 75 mmϕ; lower part: 60 mmϕ; depth: 75 mm; and draw ratio S=1.0) at a sheet temperature of 140° C. with compressed air (atmospheric pressure: 5 kgf/cm²) to give a thermoformed container. The forming conditions employed were as follows.
Temperature of heater: 400° C.;
Plug: 45ϕ×65 mm;
Plug temperature: 120° C.; and
Die temperature: 70° C.

When the appearance of the thermoformed container thus obtained was visually observed, crack, lack in uniformity and locally uneven wall thickness were not found, and stretching was evenly perfected. In addition, superior transparency, and favorable appearance were ascertained.

Reference Example 1

A laminate was obtained in a similar manner to Example 20 except that the pellet (A-8) was used in place of the pellet (A-2). Using the resulting laminate, the interlayer adhesive strength between the adhesive resin layer and the layer A was determined in a similar manner to Example 20, and revealed a value of 160 g/15 mm.

INDUSTRIAL APPLICABILITY

As in the foregoing, the multilayered structure and the laminate of the present invention are suitably used for food packaging materials, various types of containers and the like since superior characteristics such as gas barrier properties are maintained even against deformation such as flexion and/or stretching.

The invention claimed is:

1. A multilayered structure, comprising at least 9 resin-layers, wherein the at least 9 resin-layers comprise in resin form a resin composition comprising an ethylene-vinyl alcohol copolymer and are each laminated with no intervening layer which is other than the ethylene-vinyl alcohol copolymer therebetween, and wherein the multilayered structure has an average thickness of no less than 0.1 μm and no greater than 1,000 μm, and an average thickness of a single layer of the at least 9 resin layers is no less than 0.01 μm and no greater than 10 μm.

2. The multilayered structure according to claim 1, wherein the ethylene-vinyl alcohol copolymer has a content of ethylene units of no less than 3 mol % and no greater than 70 mol %, and a saponification degree of no less than 80 mol %.

3. The multilayered structure according to claim 1, wherein:
the ethylene-vinyl alcohol copolymer comprises at least one selected from the group consisting of the structural units (I) and (II); and
a content of at least one selected from the structural units (I) and (II) with respect to the entire structural units is no less than 0.5 mol % and no greater than 30 mol %:

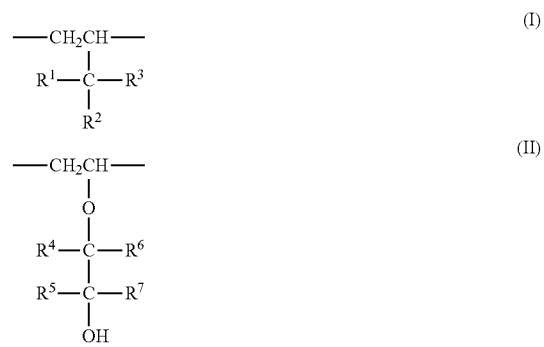

wherein:
$R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group;
two among $R^1$, $R^2$ and $R^3$ may bind with one another, such that in a case in which the two among $R^1$, $R^2$ and $R^3$ both represent a hydrogen atom, the two do not bind with one another; and the aliphatic hydrocarbon group having 1 to 10 carbon atoms, the alicyclic hydrocarbon group having 3 to 10 carbon atoms and the aromatic hydrocarbon group having 6 to 10 carbon atoms optionally have a hydroxyl group, a carboxyl group or a halogen atom;
$R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group;
$R^4$ and $R^5$ or $R^6$ and $R^7$ may bind with one another, such that in a case in which both $R^4$ and $R^5$ or both $R^6$ and $R^7$ represent a hydrogen atom, the $R^4$ and $R^5$ or both $R^6$ and $R^7$ do not bind with one another; the aliphatic hydrocarbon group having 1 to 10 carbon atoms, the alicyclic hydrocarbon group having 3 to 10 carbon atoms and the aromatic hydrocarbon group having 6 to 10 carbon atoms optionally have a hydroxyl group, an alkoxy group, a carboxyl group or a halogen atom.

4. The multilayered structure according to claim 1, wherein the resin composition further comprises a thermoplastic resin having an oxygen-scavenging ability.

5. The multilayered structure according to claim 1, wherein the resin composition further comprises a desiccant.

6. The multilayered structure according to claim 1, wherein the resin composition has a melt viscosity ($\eta_1$) as determined at a temperature of 210° C. and a shear rate of 10/sec being no less than $1 \times 10^2$ Pa·s and no greater than $1 \times 10^4$ Pa·s and a melt viscosity ($\eta_2$) as determined at a temperature of 210° C. and a shear rate of 1,000/sec being no less than $1 \times 10^1$ Pa·s and no greater than $1 \times 10^3$ Pa·s, and a ratio ($\eta_2/\eta_1$) of the melt viscosity satisfies formula (1):

$$-0.8 \leq (\tfrac{1}{2})\log_{10}(\eta_2/\eta_1) \leq -0.1 \qquad (1).$$

7. The multilayered structure according to claim 1, comprising as part of the at least 9 resin layers a layer A and a layer B comprising in resin form resin compositions, respectively, that are different with one another in terms of at least one characteristic selected from the group consisting of formulation, blend ratio and structure of the ethylene-vinyl alcohol copolymer.

8. The multilayered structure according to claim 7, wherein the layer A and the layer B are alternately laminated.

9. The multilayered structure according to claim 7, wherein a difference between contents of ethylene units of an ethylene-vinyl alcohol copolymer of the layer A and contents of ethylene units of an ethylene-vinyl alcohol copolymer of the layer B is no less than 3 mol % and no greater than 50 mol %.

10. The multilayered structure according to claim 7, wherein only one resin composition of the layer A and the layer B comprises a thermoplastic resin having an oxygen-scavenging ability.

11. The multilayered structure according to claim 7, wherein only one resin composition of the layer A and the layer B comprises a desiccant.

12. The multilayered structure according to claim 7, wherein a ratio ($\eta_{2B}/\eta_{2A}$) of a melt viscosity ($\eta_{2B}$) of the resin composition of the layer B to a melt viscosity ($\eta_{2A}$) of the resin composition of the layer A as determined at a temperature of 210° C. and a shear rate of 1,000/sec is 0.1 or greater and 10 or less.

13. The multilayered structure according to claim 1, wherein resin compositions of the at least 9 resin-layers are identical.

14. A laminate, comprising the multilayered structure according to claim 1, and a layer of a thermoplastic resin other than the ethylene-vinyl alcohol copolymer laminated on the multilayered structure.

15. The laminate according to claim 14 having an average thickness of no less than 1 µm and no greater than 5,000 µm.

16. The laminate according to claim 14, wherein:
a resin composition of a layer positioned outermost of the multilayered structure comprises at least one metal salt selected from the group consisting of an alkali metal salt, an alkaline earth metal salt and a metal salt of a group IV d-block element of the periodic table; and
the thermoplastic resin layer is laminated so as to be in contact with the layer positioned outermost of the multilayered structure.

17. The laminate according to claim 14, which is suitable for food packaging.

18. A method for producing the multilayered structure according to claim 1, the method comprising forming the multilayered structure by a multilayer coextrusion process with a resin composition comprising an ethylene-vinyl alcohol copolymer.

19. A method for producing the laminate according to claim 14, the method comprising forming the laminate by a multilayer coextrusion process with a resin composition comprising an ethylene-vinyl alcohol copolymer and a thermoplastic resin.

20. The multilayered structure according to claim 1, wherein the average thickness of a single layer of the at least 9 resin layers is no less than 0.01 µm and no greater than 7 µm.

* * * * *